US010717528B1

(12) United States Patent
Tran

(10) Patent No.: US 10,717,528 B1
(45) Date of Patent: Jul. 21, 2020

(54) AUTOMATIC FLYING DELIVERY DRONE IN PRECALCULATED FLIGHT ROUTES AND METHOD FOR DELIVERING MERCHANDISES

(71) Applicant: Trung Vo Tran, Ho Chi Minh (VN)

(72) Inventor: Trung Vo Tran, Ho Chi Minh (VN)

( * ) Notice: Subject to any disclaimer, the term of this patent is extended or adjusted under 35 U.S.C. 154(b) by 0 days.

(21) Appl. No.: 16/591,620

(22) Filed: Oct. 3, 2019

(51) Int. Cl.
| | |
|---|---|
| *B64C 39/02* | (2006.01) |
| *G06Q 10/08* | (2012.01) |
| *G05D 1/10* | (2006.01) |
| *B64D 47/08* | (2006.01) |
| *G05D 1/04* | (2006.01) |

(52) U.S. Cl.
CPC .......... *B64C 39/024* (2013.01); *B64D 47/08* (2013.01); *G05D 1/042* (2013.01); *G05D 1/101* (2013.01); *G06Q 10/0832* (2013.01); *G06Q 10/0835* (2013.01); *B64C 2201/042* (2013.01); *B64C 2201/128* (2013.01); *B64C 2201/141* (2013.01)

(58) Field of Classification Search
CPC .................................................. B64C 39/024
See application file for complete search history.

(56) References Cited

U.S. PATENT DOCUMENTS

| | | | | |
|---|---|---|---|---|
| 9,070,101 | B2 * | 6/2015 | Abhyanker | G01C 1/00 |
| 9,350,954 | B2 * | 5/2016 | Wagreich | G05D 1/0016 |
| 9,373,149 | B2 * | 6/2016 | Abhyanker | G06Q 50/28 |
| 9,404,751 | B2 * | 8/2016 | Shin | G06T 17/05 |
| 9,423,506 | B2 * | 8/2016 | Persson | G01S 19/40 |
| 9,429,438 | B2 * | 8/2016 | Weng | G01C 21/32 |
| 9,493,235 | B2 * | 11/2016 | Zhou | B60F 5/02 |
| 10,106,153 | B1 * | 10/2018 | Xiao | B60W 30/06 |
| 2018/0045522 | A1 * | 2/2018 | Aziz | G01C 21/32 |

* cited by examiner

*Primary Examiner* — Alex C Dunn

(57) ABSTRACT

A virtualized infrastructure for guiding delivery drones, a drone delivery method, and a wingless delivery drone are disclosed that includes a container for storing payloads; a plurality of thrust motors arranged in an array on an X-Y surface below and parallel to a bottom surface of the payload container; and a drone electrical system configured to control the operations of the array of the thrust motors so as to fly the container from the first address to the destination address upon receiving the optimal flight route from the virtualized infrastructure and to maintain the balance to payload container.

20 Claims, 21 Drawing Sheets

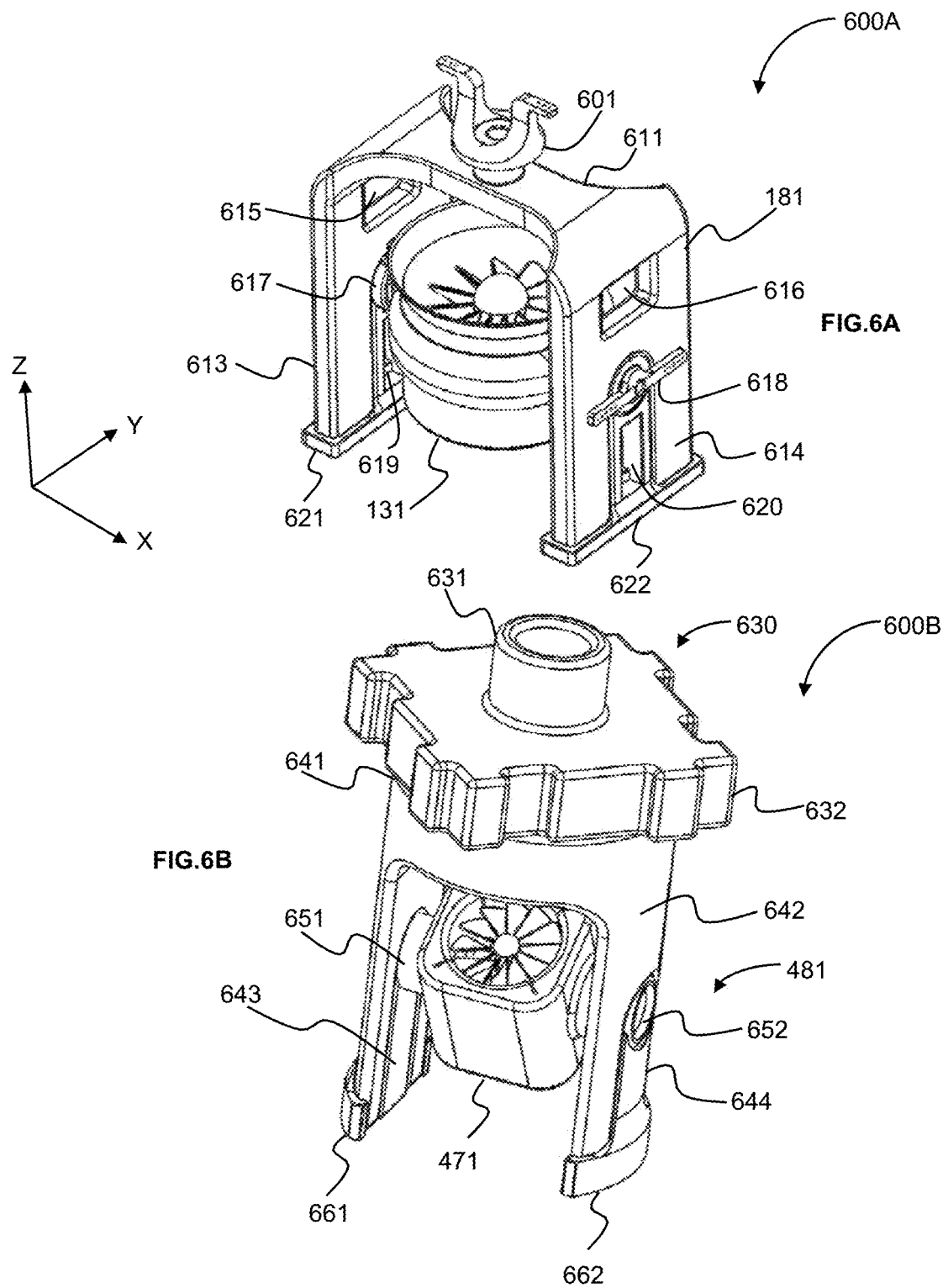

AUTOMATIC FLYING DELIVERY DRONE IN PRECALCULATED FLIGHT ROUTES AND METHOD FOR DELIVERING MERCHANDISES

FIELD OF THE INVENTION

The present invention relates generally to merchandise delivery drones. More specifically, the present invention relates to a wingless delivery drone without the conventional wings and propellers so as to guarantee safety to the people and properties in the surrounding areas.

BACKGROUND ART

Delivery drones are increasingly being used worldwide to deliver merchandise to the customers. This is mainly due to the increase in the on-line purchases of products. However, there exist many problems that threaten the efficiencies as well as the operability of the conventional delivery drones: safety, range, harsh weather, and accidents.

The first problem is the safety of the surrounding areas where conventional drones drop off the packages. Conventional drones are driven by tri-copters, quadcopters, or octocopters which have propellers located on top of the drone main bodies and extending broadly outward. The motors in these drones are defined by the KV ratings. The KV ratings are related to RPM (round per minute) by the following formula: RPM=KV*volts. Thus, the lesser the KV rating, the more propeller size that gives more stability and more efficiency. A wide variety of motors are used in conventional drones, ranging from 40 KV to 1900 K V. Larger blades, over eight inches, are paired with motors that have low KV ratings and can be used to carry heavier payloads. Propellers are normally made of carbon fiber, plastic, and glass. Drone motors have a speed range of 10,000-40,000 rpm. The top speed of the propeller tip depends on the propeller diameter. For example, a propeller with a 9.4-in diameter and a motor with 25,000 rpm leads to a propeller tip speed of about 700 mph. At this speed, even with propeller guards, drones can fatally hurt the people, cause fatal collision with commercial/military aircrafts, or damage properties. Indeed, the number of drone-mediated threats has been increasing since 2017. The rapid growth of hobbyist and commercial drones also increases the risks of accidents. In June 2017, 1,600 PG&E customers in Mountain View, Calif., lost power after a drone crashed into a high-voltage wire. In September 2017, a civilian-operated drone hit a U.S. Army Black Hawk helicopter flying near Staten Island. In addition, delivery drones with large propellers cannot navigate in narrow alleys in compact condominium.

The second problem with conventional delivery drones is the weather. When it is hot, the air density drops, reducing dramatically the lifting capacity of the propellers of the conventional drones. When the weather turns really cold, energy capacity drops significantly. In addition, drones will be dangerous in the snow, fog, and rain. Particularly when lightening occurs. High and gusting winds are also problematic. Conventional drones need to handle a wide spectrum of weather conditions. Otherwise, they are not dependable. Conventional weather resistant drones such as the Matrix 200 drone series (DJI's M200 series) with Zenmuse X4S, X5S, and Z30, etc. gimbal cameras; water proof drones such as QuadH2O's HEXH2O Pro V2 require waterproof and buoyancy aids. These commercial weather resistant drones often require redundancy batteries, advanced propulsion system, state-of-the art flight controller, and built-in Wi-Fi chip which provides with all-time connection regardless of the weather. However, these conventional weather resistant drones mentioned above are reconnaissance and observation drones which are controlled remotely by operators using software applications. These drones cannot fly by themselves without being guided by operators.

The third problem with conventional drones is the drone's range. The weight and size, aerodynamic, of the product being delivered will have a huge adverse impact on the drone's range. Drone's operators must consider these issues before sending the drones off for delivery. A headwind will cut into a drone's range dramatically, not to mention wind that exceeds the drone's top air speed. Furthermore, when the payloads include foods such as soups, noodles with broths, the headwind may cause the delivery drones to flip, spilling the soups and broths. Amazon's Prime Air, an octocopter, can only deliver a five pound package in a 30-minute flight. Burrito Bomber is a drone that has to be launched by hand like a kite. DomiCopter are silent regarding the range of pizza deliveries.

The fourth problem with conventional delivery drones is obstacles along the way. When making deliveries in cosmopolitan cities like New York, Ho Chi Minh City, power lines, narrow passage ways, and/or unwanted obstacles can destroy the delivery drones. Fatal accidents to properties and people can happen in the vicinity of the flight path of the conventional drones. This is especially true with commercial drones having large and powerful propeller blades. Currently, drones with collision avoidance sensors are only toy drones whose only functions are entertaining and photographing (fly-cams) in open fields. These toy drones cannot fly beyond the operators' vision range.

Finally, conventional drones do not have a carefully and optimally charted flight course. Thus, they are prone to collide with powerlines, military and commercial aircrafts, and unwanted obstacles even with a simple pilot errors. GPS Waypoints can guide drones to deliver parcels without the need of a pilot. However, GPS waypoints do not take into considerations of safe altitudes and other objects along the drone's flight path. Waypoints can only help drones to fly in a straight line from point A to point B without knowing other objects such as powerlines, buildings, and trees along the line. Furthermore, these conventional drones cannot make convenient delivery to customers who live in high-rise apartments and/or condominiums. This is especially inconvenient for incapacitated customers who have limited mobility.

Therefore what is needed is a delivery drones and a delivery system that can overcome the above described problems.

SUMMARY OF THE INVENTION

Accordingly, an object of the present invention is to provide a delivery drone which comprises: a three-dimension (3D) container with a top side, a bottom side, lateral sides that form a container space for storing a payload; a plurality of thrust motors arranged in an array on a X-Y surface below and parallel to a bottom surface of the payload container; and a drone electronic system, electrically coupled to the array of thrust motors, operable to fly the array of thrust motors to and from a first address and a second address along a virtualized infrastructure that is loaded into the drone electronic system, wherein the virtualized infrastructure is constructed from a Global Positioning System (GPS) map and a 3D map with a common coordinate system.

Another object of the present invention is to provide package delivery system, comprising: a wingless delivery drone comprising an array of thrust motors mechanically connected to an exterior surface of a bottom side of the wingless delivery drone, and a drone electronic system; a three-dimension (3D) virtualized infrastructure of a geographical cell within which the delivery drone is programmed to operate, wherein the 3D virtualized infrastructure further comprises a plurality layers of streets in accordance with a Global Positioning System (GPS) and a 3D model of the geographical cell; and an instruction program comprising instructions that cause the drone electronic system to fly the wingless delivery drone to and from a first address and a second address without a pilot.

Another object of the present invention is to provide a method of delivering a payload from a warehouse to a destination, comprising: forming a three-dimension (3D) map of a geographical cell comprising a plurality of layers of streets in accordance with a Global Positioning System (GPS); receiving a delivery information of the destination, the delivery information comprising GPS directions and a predetermined safe altitude; and automatically flying the wingless delivery drone without the control of an operator along the optimal flight route.

Yet another object of the present invention is to provide a delivery drone that does not use any protruding propellant blades which may cause harms to the people in the vicinity of the drone.

Another object of the present invention is to provide a delivery drone that can balance itself during flight and can avoid collision with other objects by using collision avoidance technology and pre-planned optimal flight route.

Another object of the present invention is to provide a delivery drone that can navigate in narrow passages and avoid collision with sudden incoming obstacles that intrude into the flight route of the delivery drone.

Another object of the present invention is to provide delivery drones, virtualized infrastructure, and drone delivery system that can deliver packages during adverse weather conditions.

Another object of the present invention is to provide a delivery drone that can conveniently deliver packages to customers either at the balconies of the high rises or in front yards of residential homes.

Finally, another objective of the present invention is to provide a virtualized infrastructure that can provide a safe and optimal flight routes for delivery drones that can minimize accidents and improve efficiencies.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 6A illustrates a three-dimension (3D) perspective view of a frame bracket for one type thrust motor in accordance with an exemplary embodiment of the present invention;

FIG. 6B illustrates a three-dimension (3D) perspective view of another frame bracket for a different type of thrust motor in accordance with an exemplary embodiment of the present invention;

The figures depict various embodiments of the technology for the purposes of illustration only. A person of ordinary skill in the art will readily recognize from the following discussion that alternative embodiments of the structures and methods illustrated herein may be employed without departing from the principles of the technology described herein.

DETAILED DESCRIPTION OF THE INVENTION

Reference will now be made in details to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in details so as not to unnecessarily obscure aspects of the present invention.

Figure 19:
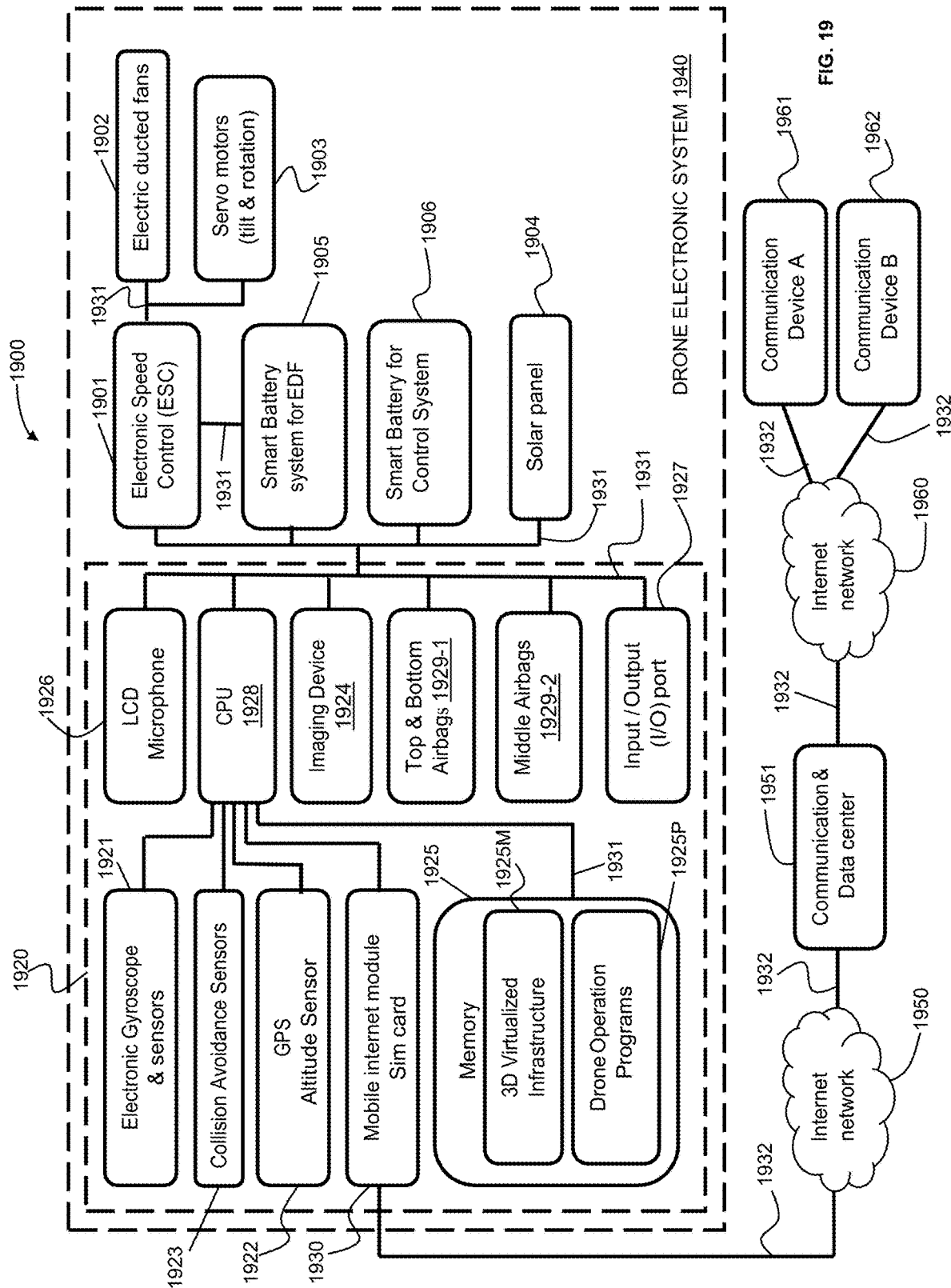
FIG. 19 is a perspective diagram of the electronic delivery system for the delivery drones in accordance with an exemplary embodiment of the present invention.
Figure 20:
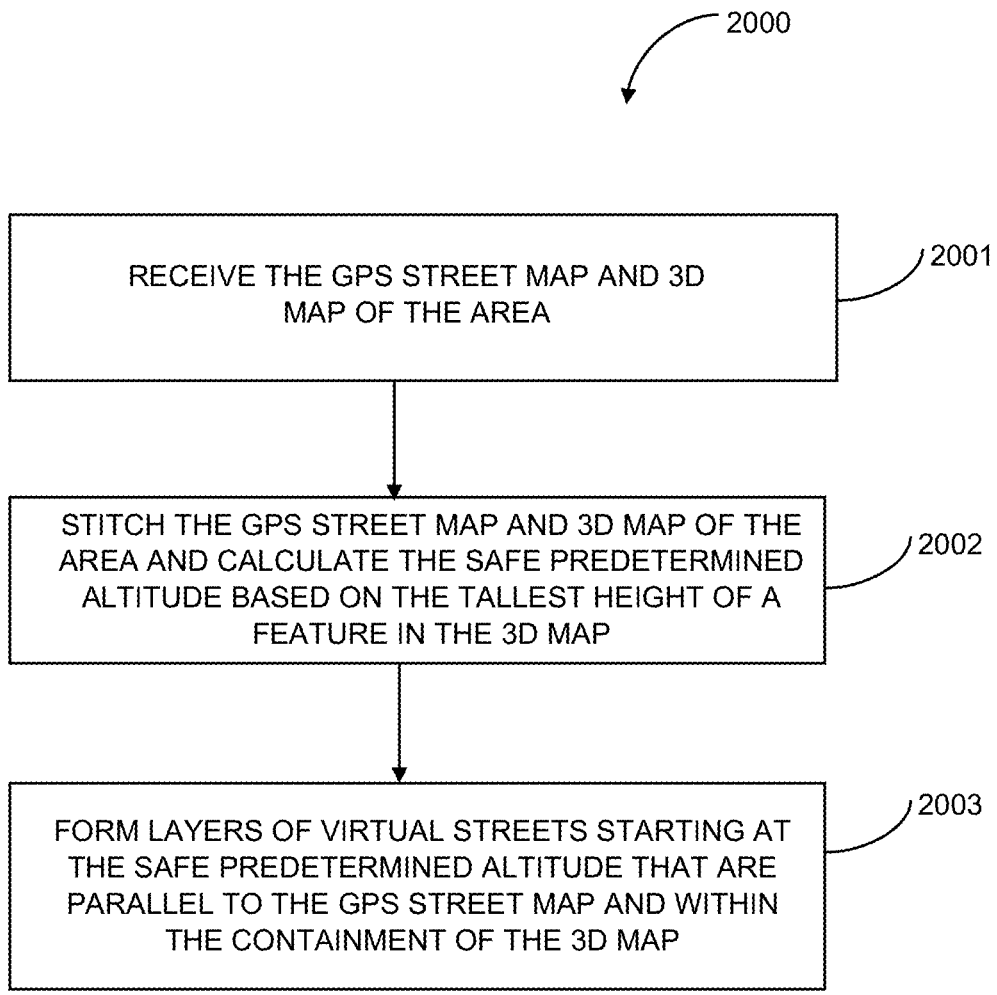
FIG. 20 is a flow chart of a method of constructing a virtualized infrastructure for guiding the delivery drones in accordance with an exemplary embodiment of the present invention.
Figure 21:
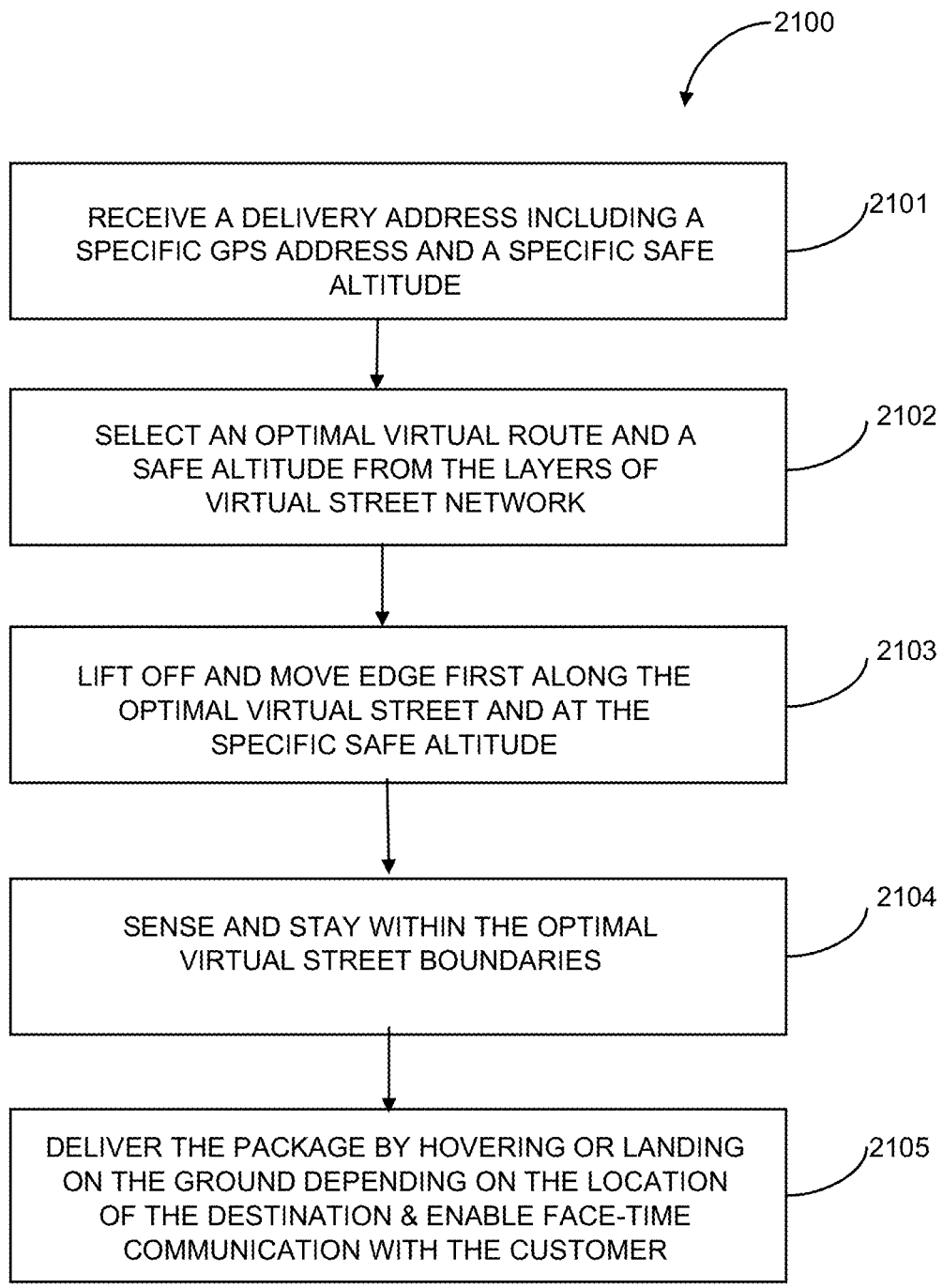
FIG. 21 is a flow chart of a method of delivering packages to customers using delivery drones and the virtualized infrastructure in accordance with an exemplary embodiment of the present invention.

Exemplary embodiments and aspects of the present invention are now described with reference to FIGS. 1 to 21. The present disclosure discloses the following features of the present invention: (1) the delivery drones, (2) the virtualized infrastructure designed to fly the delivery drones in specific and definite optimal flight route without the need of a pilot and a remote control, and (3) a method of delivery packages to customers using (1) and (2). FIG. 1-FIG. 10 illustrate the mechanical structure of three different delivery drones. That is, the 2×2 delivery drone, the 4×4 delivery drone, and the N×M delivery drone where N≠M. FIG. 11-FIG. 18 describe the virtualized infrastructure configured to guide the delivery drones to fly automatically. FIG. 19 illustrates the drone electronic delivery system for the delivery drones of the present invention. FIG. 20 shows the flow chart diagram of a method of constructing the virtualized infrastructure for the delivery drones. FIG. 21 is a flow chart of a method of delivering packages to customers using the delivery drones and the virtualized infrastructure of the present invention.

Figure 1:
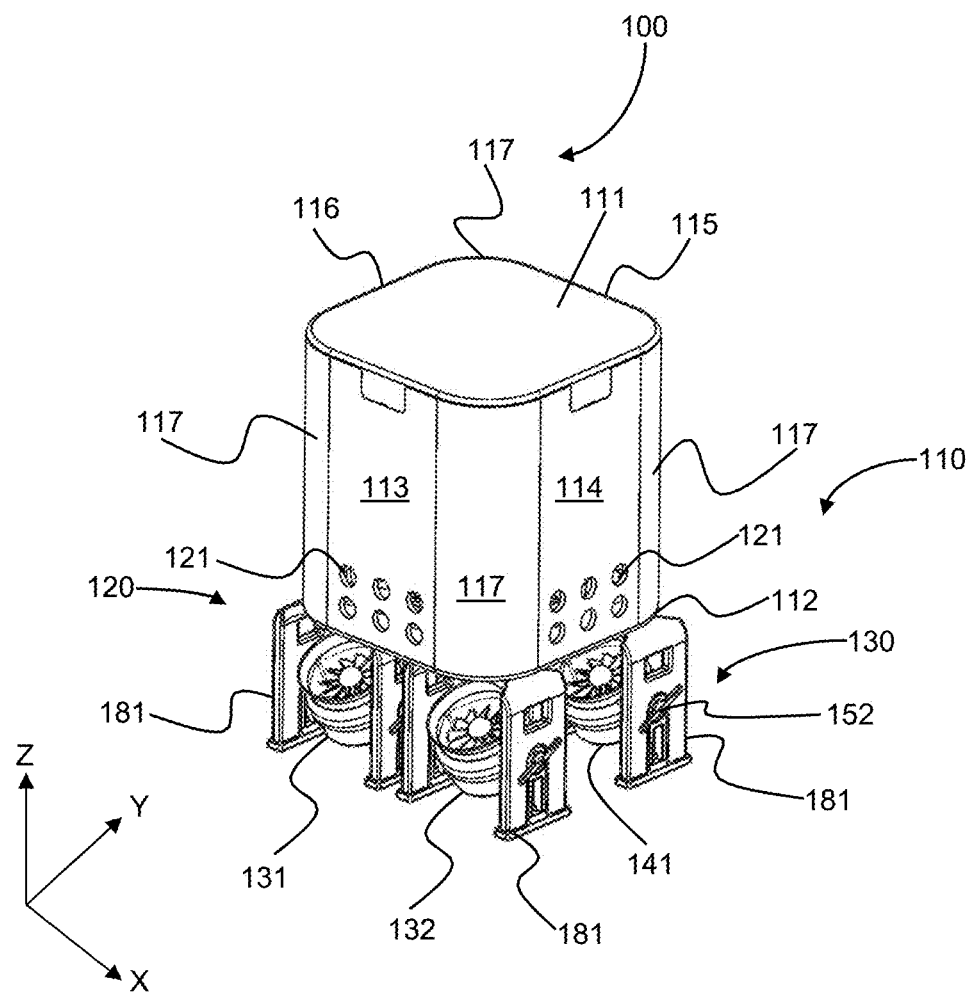
FIG. 1 is a three dimension (3D) perspective diagram of a 2×2 delivery drone in accordance with an exemplary embodiment of the present invention.

Now referring to FIG. 1, FIG. 1 is a three-dimension (3D) perspective drawing of a delivery drone 100 without wings and propelling blades ("delivery drone 100") in accordance with an exemplary embodiment of the present invention. Without extending wings and propelling blades, delivery drone 100 is designed to avoid fatal accidents to the people and damage to properties along its flight routes. Delivery drone 100 includes a container 110, an electronic section 120, and an array of thrust motors 130. In various embodiments of the present invention, container 110 is a parallelepiped box having a top side 111, a bottom side 112, lateral sides 113-116, and vertices 117 (or "edge 117"). In other various embodiments of the present invention, container 110 is a cubic box. However, it will be noted that container 110 can have any geometrical shapes that are aerodynamic and suitable to different delivery conditions. Electronic section 120 contains an electronic system that is the brain of delivery drone 100 which is configured to control the operations and other aspects of array of thrust motors 130. In addition, electronic section 120 also contain a virtualized infrastructure of the geographical cell where delivery drone 100 is making deliveries. As such, electronic section 120 is operable to select an optimal flight route for delivery drone 100 to avoid collision with electrical powerlines, potential dangers, and other intruding foreign objects.

In various embodiments of the present invention, delivery drone 100 has the size of 332 mm×332 mm×385 mm. Container 110 has the size of 248 mm×248 mm×176 mm. Electronic section 120 has the size of 248 mm×248 mm×77 mm. The total empty weight of delivery drone 100 is 3.5 kg. As can be seen from FIG. 1, in one embodiment of the present invention, array of thrust motors 130 contains an array of 2×2 thrust motors, or 4 thrust motors in total, arranged in the X-Y surface that is parallel to bottom side 112 of container 110. This 2×2 array of thrust motors contains thrust motors 131, 132, 141, and 142 disposed to and mechanically connected to electronic section 120. Each thrust motors 131, 132, 141, 142 is enclosed in a frame bracket 181 via a pair of tilt connectors 157-158. All thrust motors 131, 132, 141, and 142 are arranged in flush to lateral sides 113-116 so that they do not protrude outside of lateral sides 113-116, totally avoiding fatal accidents to the people who are unwittingly present in the flight route of delivery drone 100. In various embodiments of the present invention, thrust motors 131-142 use quiet electric ducted fan (qEDF). The qEDF has 12 blades totally contained within frame bracket 181. The diameter of the duct is 70 mm. Each qEDF draws 75A of current at 23V supply voltage and can produce 1725 W of power. Delivery drone 100 having four qEDF can produce 6,900 W of lift power for 8.4 kg of thrust. In some embodiments of the present invention, thrust motors 131-142 can use a fuel jet engine.

In operation, for vertical lift off, delivery drone 100 has thrust motors 131 and 141 rotate in a clockwise direction while thrust motors 132 and 142 rotate in the counter-clockwise direction so that delivery drone 100 does not rotate around itself (or Z-axis), and lift off straight vertically. Otherwise, delivery drone 100 continues to rotate around itself and wobbles, wasting energies. Upon reaching a desired altitude, delivery drone 100 is designed to fly edge 117 first by changing both the rotation of frame bracket 181 and the tilt of thrust motors 131-142. In the present invention, all delivery drones—such as delivery drone 100 whose container 110 has a square structure and N×M arrangement of thrust motors where N=M are configured to fly edge first. Other shapes and N×M arrangement of thrust motors where N≠M, these types of delivery drones of the present invention are configured to fly the smallest lateral side first. However, at low speed, such as when delivering at the destination (please see FIG. 11-FIG. 18), delivery drone 100 can fly lateral side 113 first to make convenient delivery to the waiting customers.

With such arrangements, delivery drone 100 of the present invention achieve the following objects: (a) Electronic section 120 is laid out on bottom side 112 adjacent to array of thrust motors 130 for optimal control without any extension of electrical wires; (b) delivery drone 100 avoid fatal propeller accidents to properties and people in the vicinity of its flight route; (c) delivery drone 100 with container 110 is perfect to deliver any type of packages from one place to another; and (d) the arrangement of thrust motors in the N×M array format provides efficiencies and versatilities, e.g., vertical take-off and landing (VTOL); forward, backward, turning, rotating flights in all directions with ease.

Figure 2:
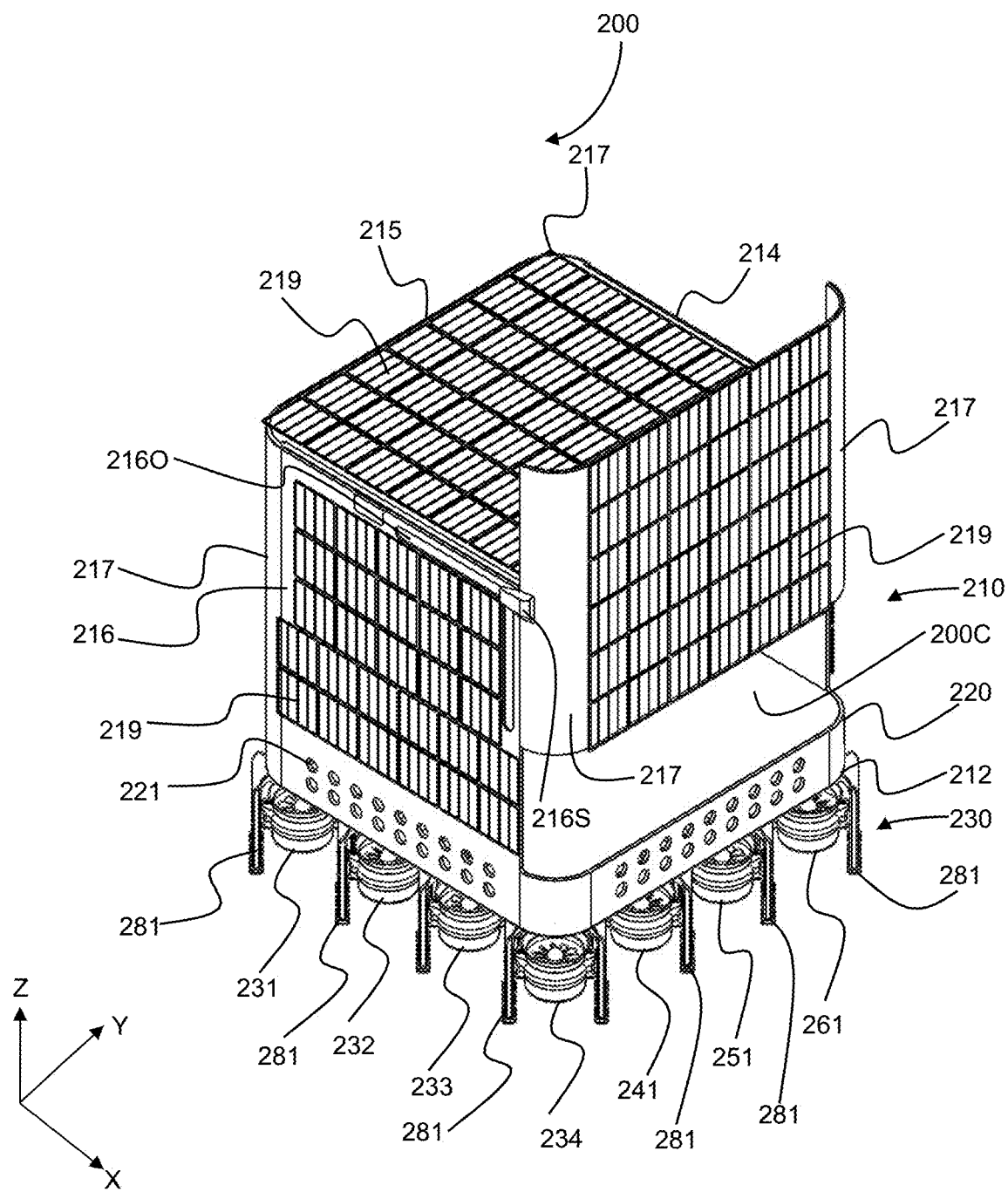
FIG. 2 is a three dimension (3D) perspective diagram of a 4×4 delivery drone with solar panels and smart batteries in accordance with an exemplary embodiment of the present invention.

Now referring to FIG. 2, FIG. 2 is a three-dimension (3D) perspective drawing of a 4×4 delivery drone 200 in accordance with another exemplary embodiment of the present invention. 4×4 delivery drone 200 includes a container 210, an electronic section 220, and a 4×4 array of thrust motors 230. 4×4 array of thrust motors 230 means that drone 200 contains a 4×4 array of thrust motors arranged in rows and columns on the X-Y surface parallel and closest to a bottom side 212. 4×4 array of thrust motor 230 includes 231, 232, 233, 234 thrust motors arranged on the first row along the edge of a lateral side 213. Thrust motors 241, 242, 243, 244 are on the second row. Thrust motors 251, 252, 253, 254 are on the third row (from lateral side 213). Finally, thrust motors 261, 262, 263, and 264 are on the fourth row, which are aligned with a lateral side 215. In general, within the meaning of the present invention, an N×M drone includes N×M thrust motors where N and M are positive integers, and N=M. Similar to the description of delivery drone 100 in FIG. 1, delivery drone 200 does not include extending wings and propelling blades, a feature designed to avoid fatal accidents to the people and damage to properties along the flight route of delivery drone 200. In many embodiments of the present invention, container 210 is a wingless parallel-epiped box having a top side 211, a bottom side 212, lateral sides 213-216, and vertices 217 (or "edge 217"). As shown in FIG. 2, container 210 is a cubic box (4×4 or N=M). However, as noted above, container 210 can have any geometrical shapes that are aerodynamic and suitable to different delivery conditions and geometrical shapes of the parcels. In various embodiments, top side 211 and lateral sides 213-216 are equipped with solar panels 219 so that drone 200 can fly in a longer path using the same smart batteries without carrying redundancy batteries.

In addition, lateral side 213 is a 90 degree slide door that is slid to open by moving to lay on top side 211. When this happens, container 210 exposes an interior space 200C configured to contain packages. Customers can reach in interior space 200C to retrieve their packages. A 90-degree slide door mechanism is used to slide lateral side 213 open. 90-degree slide door mechanism includes a 90 degree slide brackets 214O, 216O that are attached to the edge of lateral sides 214 and 216 respectively. A pair of slide connectors 214S, 216S slide along 90 degree slide bracket 214O, 216O respectively to open or close lateral side 213. Electronic section 220 is the brain of delivery drone 200 that contain different integrated circuits (IC) that control the operations of 4×4 array of thrust motors 230 as well as the opening/closing of 90 degree slide door, and solar panel 219. On bottom side 212 of container 210, an array of side ventilation openings 221 is formed to provide heat escape to electronic section 220. In addition, electronic section 220 also contain a memory that stores the virtualized infrastructure of the geographical area where delivery drone 200 is commissioned to operate. As such, electronic section 220 is operable to select an optimal flight route for delivery drone 200 to avoid collision with properties, electrical powerlines, or other foreign objects. In various embodiments of the present invention, delivery drone 200 and array of thrust motors 230 are controlled by electronic section 220 to fly edge 217 first at a velocity V. Upon arrival at the destination where the delivery is made, electronic section 220 controls array of thrust motors 230 so that delivery drone 200 can turn and fly lateral sides 213-216 first. The detailed description of electronic section 220 and the virtual infrastructure will be described in details in FIG. 19 to FIG. 21.

Still referring to FIG. 2, each thrust motors 231-264 are enclosed in a frame bracket 281 which is arranged in flush to lateral sides 213-216. Again, thrust motors 231-264 do not protrude outside of lateral sides 213-216, totally avoiding fatal accidents caused by propeller lacerations to the people who are unwittingly present in the flight route of delivery drone 200. With such arrangements, delivery drone 200 achieve the following main objects of the present invention: (a) Electronic section 220 is laid out on bottom side 212 adjacent to 4×4 array of thrust motors 230 for optimal control without any extension of electrical wires; (b) drone 200 avoid fatal accidents to properties and people; (c) the arrangement of thrust motors in the N×M array format provides efficiencies and versatilities, e.g., vertical take-off and landing (VTOL); forward, backward, turning, rotating flights in all directions with ease; and (d) electronic section 220 guides drone 200 to fly on an optimal path with edge 217 leading along a safe virtual infrastructure to achieve efficiencies.

Figure 3A:
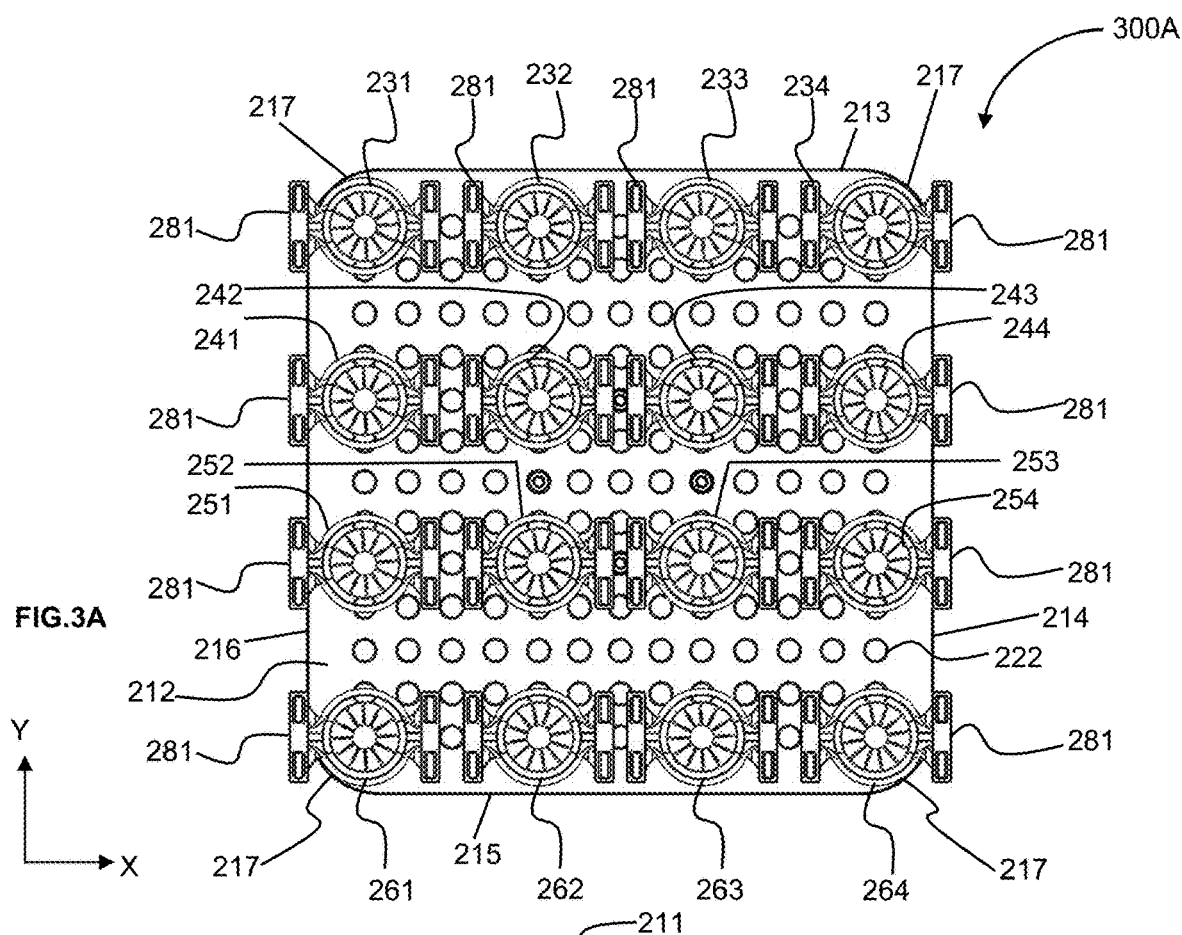
FIG. 3A is a two dimension (2D) bottom view of the arrangement of the thrust motors of the 4×4 wingless delivery drone in accordance with an exemplary embodiment of the present invention.

Now referring next to FIG. 3A, a three-dimension (3D) bottom view 300A of the arrangement of thrust motors 231-264 of delivery drone 200 is shown. There are 16 thrust motors 231-246 arranged in a 4×4 matrix in the X-Y plane (N=M). In various embodiments of the present invention, thrust motors 231-234 are arranged on the first row along the edge of lateral side 213 from left to right, from lateral side 216 to 214. Next, thrust motors 241-244 are arranged on the second row from the edge of lateral side 213. On the third row from the edge of lateral side 213, thrust motors 251-254 are arranged. On the last row, thrust motors 261-264 are arranged along the edge of lateral side 215 opposite to lateral side 213. Each thrust motor 231-264 are enclosed in frame bracket 281 bolted to bottom side 212. Bottom side 212 is punctuated by bottom ventilation openings 222.

Figure 3B:
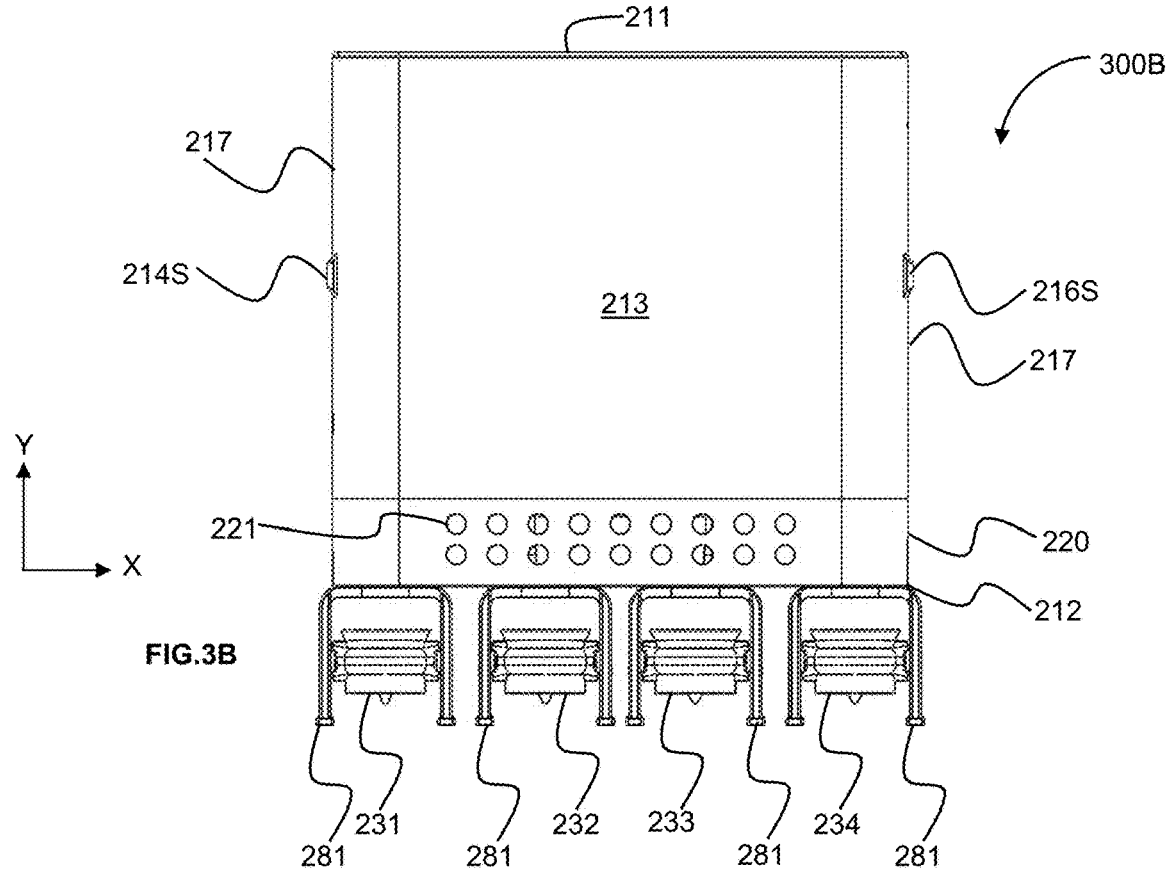
FIG. 3B is a two dimension (2D) side view of a 4×4 delivery drone in accordance with an exemplary embodiment of the present invention

FIG. 3B illustrate a two-dimension (2D) side view 300B of delivery drone 200. Side view 300B shows that thrust motors 231-234 are connected to bottom side 212 where electronic section 220 is located. Each thrust motor 231-234 is enclosed in frame 281 designed as both protecting and landing feet for delivery drone 200. From lateral side 213, side ventilation openings 221 are seen. Lateral side 213 is also the 90 degree slide door and slide brackets 214O and 216O are hinged to lateral side 214 and lateral side 216 respectively. To open, lateral side 213 slides upward using slide connectors 214S and 216S in the Z-axis and then bends 90 degrees to rest on top of top side 211. Since delivery drone 200 is a square drone and has 4×4 thrust motors, it is designed to fly edge 217 first at high speed. However, at the destination, to make a delivery, delivery drone 200 can fly lateral side 213 first. Please refer to FIG. 11-FIG. 18 for detailed description of the operations of delivery drones 100 and 200. The operation and description of thrust motors 231-264 are similar to thrust motors 131-142 in FIG. 1.

In various embodiments of the present invention, delivery drone 200 has the size of 744 mm×744 mm×631 mm. Container 210 has the size of 537 mm×537 mm×419 mm. Electronic section 220 has the size of 207 mm×207 mm×22 mm. The total empty weight of delivery drone 200 is 8 kg. Thrust motors 231-264 use quiet electric ducted fan (qEDF). The qEDF has 12 blades totally contained within frame bracket 281. The diameter of the duct is 70 mm. Each qEDF draws 75A of current at 23V supply voltage and can produce 1725 W of power. Delivery drone 200 having sixteen qEDFs can produce 27,600 W of lift power for 35 kg of thrust. In some embodiments of the present invention, thrust motors 231-264 can use a fuel jet engine.

In operation, for vertical lift off, delivery drone 200 has every neighboring pair of thrust motors rotates in opposite directions to avoid self-rotation and wobbling. More particularly, on the first row: thrust motor 231 rotates in a clockwise direction while thrust motor 232 rotates in the counter-clockwise direction; thrust motor 233 rotates in a clockwise direction while thrust motor 234 rotates in the counter-clockwise direction. On the second row: thrust motor 241 rotates in a counter-clockwise direction while thrust motor 242 rotates in the clockwise direction; thrust motor 243 rotates in a counter-clockwise direction while thrust motor 244 rotates in the clockwise direction. On the third row: thrust motor 251 rotates in a clockwise direction while thrust motor 252 rotates in the counter-clockwise direction; thrust motor 253 rotates in a clockwise direction while thrust motor 254 rotates in the counter-clockwise direction. On the fourth row: thrust motor 261 rotates in a counter-clockwise direction while thrust motor 262 rotates in the clockwise direction; thrust motor 263 rotates in a counter-clockwise direction while thrust motor 264 rotates in the clockwise direction. Otherwise, if all thrust motors 231-264 rotate in the same direction, delivery drone 200 continues to rotate around itself and wobbles, wasting energies.

Continuing with the operation of delivery drone 200, upon reaching a desired altitude, delivery drone 200 is designed to fly edge 217 first by changing both the rotation of frame brackets 281 and the tilt of thrust motors 231-264. In the present invention, all delivery drones—such as delivery drone 200 whose container has a square structure and N×M arrangement of thrust motors where N=M—are configured to fly edge 217 first. Other shapes and N×M arrangement of thrust motors where N≠M, these types of delivery drones of the present invention are configured to fly the smallest lateral side first. However, at low speed, such as when delivering at the destination (please see FIG. 11-FIG. 18), delivery drone 200 can fly lateral side 213 first.

Figures 4A, 4B:
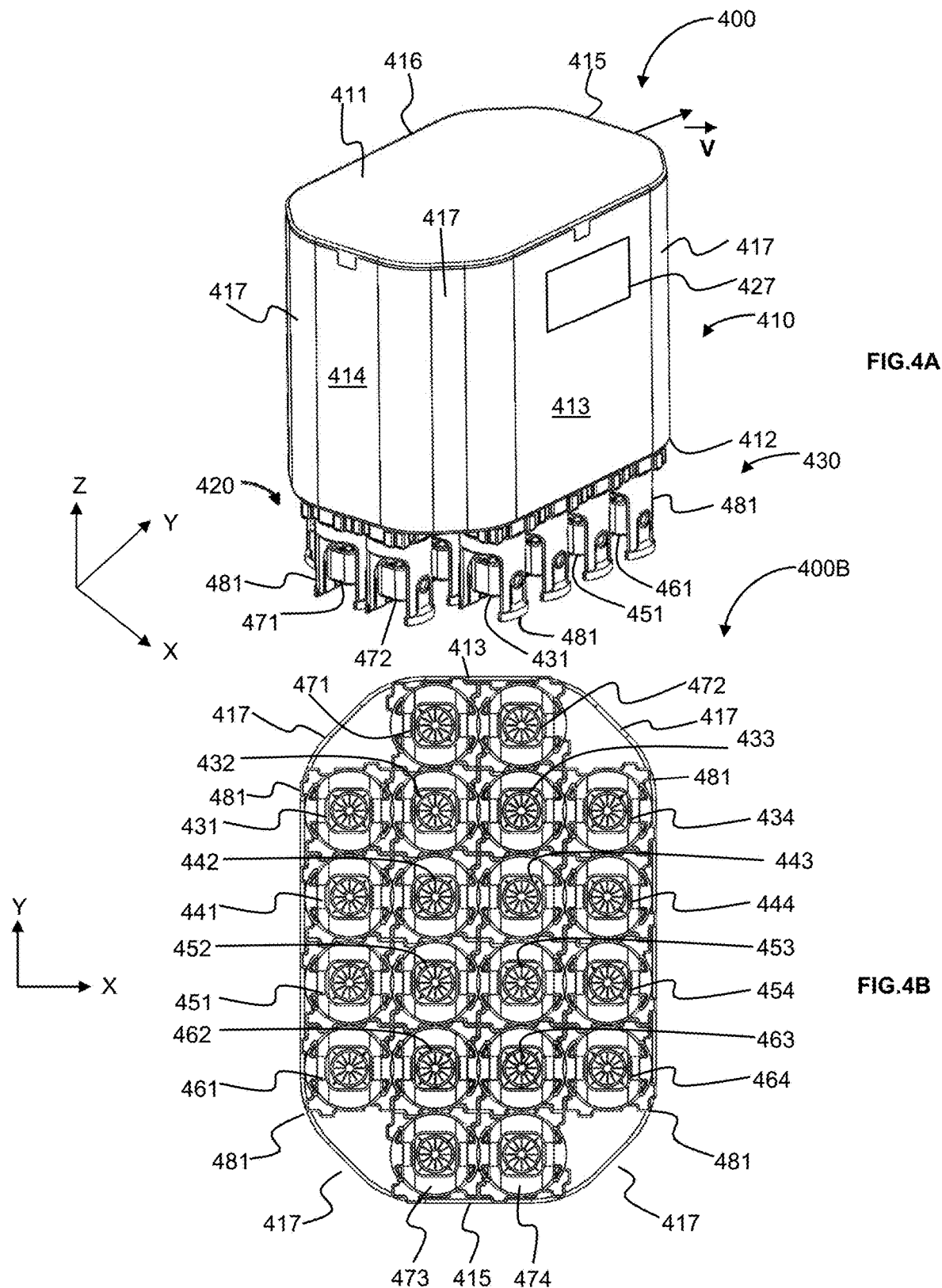
FIG. 4A is a three dimension (3D) perspective diagram of a N×M rectangular drone where N≠M in accordance with an exemplary embodiment of the present invention.
FIG. 4B is a two-dimension (2D) bottom view of the structure of the thrust motors of the N×M rectangular drone where N≠M in accordance with an exemplary embodiment of the present invention.

Now referring to FIG. 4A, a three-dimension (3D) perspective diagram of a delivery drone 400 in accordance with yet another embodiment of the present invention is illustrated. Drone 400 includes the N×M thrust motors where N and M are positive non-zero integers and N≠M. With more thrust motors, delivery drone 400 can carry heavier loads than delivery drone 100 and delivery drone 200.

Delivery drone 400 includes a container 410, an electronic section 420, and an array of thrust motors 430. In many embodiments of the present invention, container 410 is a parallelepiped box having a top side 411, a bottom side 412, lateral sides 413-416, and vertices 417 (or "edge 417"). In various embodiments, container 410 has rounded edges 417. However, it will be noted that container 410 can have any geometrical shapes that are aerodynamic and suitable to different delivery conditions and geometrical shapes of the packages. Electronic section 420 is the brain of delivery drone 400 that contain different integrated circuits (IC) that control the operations of array of thrust motors 430. In addition, electronic section 420 also contain a memory that stores virtualized infrastructure of the geographical area where delivery drone 400 is making deliveries. As such, electronic section 420 is operable to select an optimal flight route for delivery drone 400 to avoid collision with people, electrical powerlines, or other foreign objects such as military and commercial aircrafts. In various embodiments of the present invention, delivery drone 400 and array of thrust motors 430 are controlled by electronic section 420 to fly lateral face 414 first at a velocity V. Upon arrival at the destination where the delivery is made, electronic section 420 controls array of thrust motors 430 so that delivery drone 400 can turn and fly lateral sides 413 or 415 first. The detailed description of electronic section 420 and the virtual infrastructure will be described in details in FIG. 19 to FIG. 21.

Referring now to FIG. 4B, a two-dimension (2D) bottom view 400B of drone 400 is illustrated. In one embodiment of the present invention, array of thrust motors 430 contains N×M thrust motors for a total of 20 thrust motors, where N Thrust motors 430 are arranged in the X-Y surface that is on bottom side 412 of container 410. This N×M array of thrust motors contains thrust motors 471 and 472 in the front surface closest to lateral side 413. Next, a 4×4 thrust motors are arranged in the same manner described in FIG. 2 and FIG. 3A-FIG. 3B, which includes thrust motors 431-464. Next, thrust motors 473 and 474 are arranged close to lateral side 415. Each thrust motors 431-474 described above are enclosed in a frame bracket 481 which is arranged in flush to lateral sides 413-416. Thrust motors 471-474 do not protrude outside of lateral sides 413-416, avoiding fatal propeller accidents to the people who are unwittingly present in the flight route of delivery drone 400.

With such novel arrangements as described above, delivery drone 400 as well as delivery drone 100 and delivery drone 200 achieve the following objects: (a) Electronic section 420 is laid out on bottom side 412 closest to array of thrust motors 430 for optimal control without any extension of electrical wires; (b) delivery drone 400 avoid fatal propeller accidents to properties and people; and (c) electronic section 420 guides delivery drone 400 to fly lateral side 413 or 415 first on an optimal flight route along a safe virtual infrastructure to achieve safety and efficiencies; (d) delivery drone 400 with large size container 410 can be used in versatile functions such as delivering parcels and/or transporting peoples from one place to another; and (e) the arrangement of thrust motors in the N×M array format provides efficiencies and versatilities, e.g., vertical take-off and landing (VTOL); forward, backward, turning, rotating flights in all directions with ease.

Figures 5A, 5B:
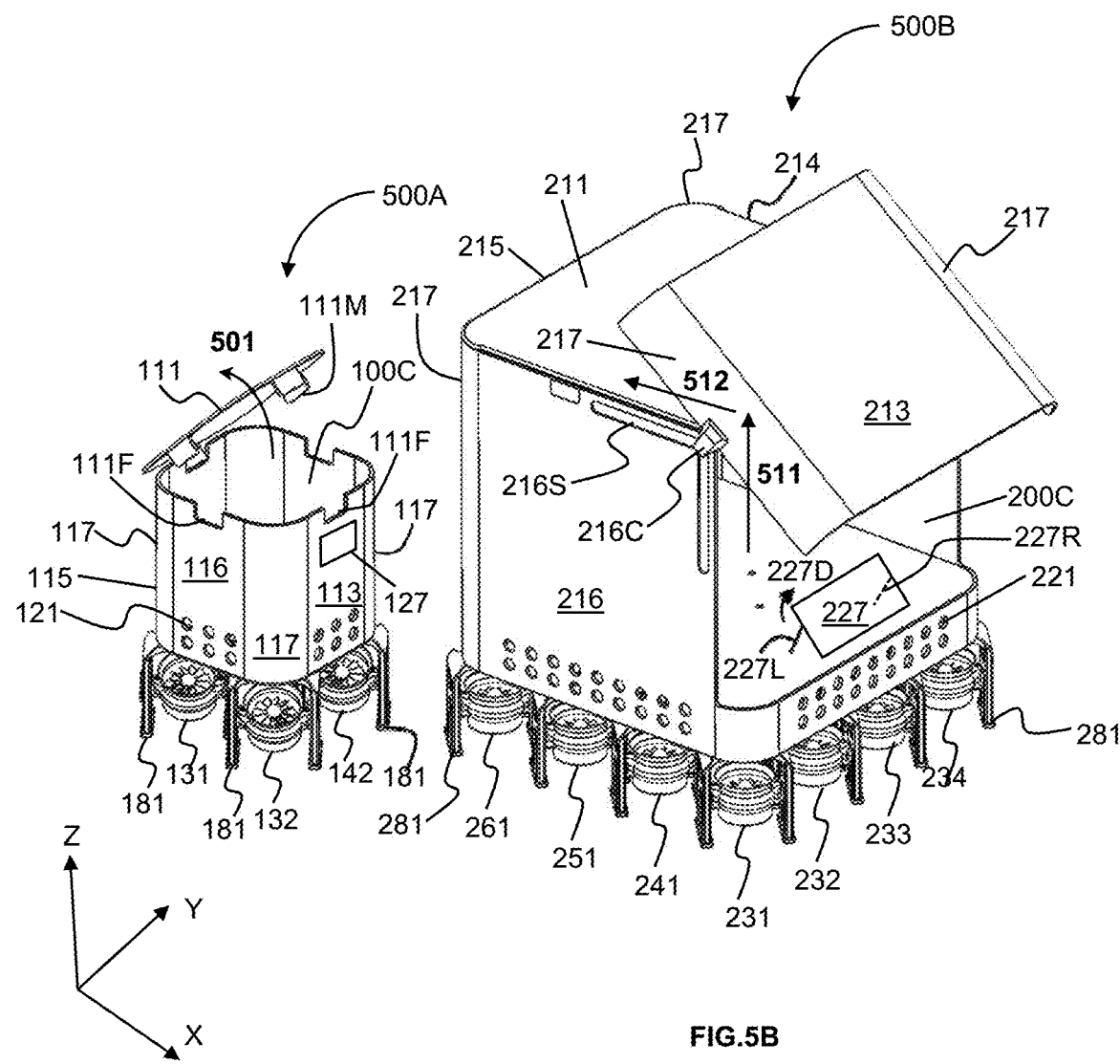
FIG. 5A illustrates a manual method of opening a 2×2 delivery drone container in accordance with an exemplary embodiment of the present invention.
FIG. 5B illustrates an automatic method of opening a 4×4 delivery drone box in accordance with an exemplary embodiment of the present invention.

Now referring to FIG. 5A-FIG. 5B which illustrate two different open mechanism for delivery drones 100, 200, and 400 described above. More particularly, FIG. 5A illustrates a three-dimension (3D) perspective view of a manual open mechanism for delivery drone 100. In first open mechanism, top side 111 is vertically lifted up along the Z-axis as shown in a direction 501. For the ease of opening, a plurality of male projectors 111M pointing downward and disposed at a small distance A away from the rim of top side 111. A plurality of female receivers 111F carved out along the top rim of container 110 at the exact location as male projectors 111M. This way, a customer can manually to lift up top side 111 along direction 501 to open container 110 and retrieve the merchandise stored in interior space 100C. In various embodiments of the present invention, a communication device 127 is placed on lateral side 113 for a face-time communication between the customer and the operator of delivery drone 100. Communication device 127 may include, but not limited to, a flat screen display, a two-way camera, a speaker and a microphone.

On the other hand, FIG. 5B illustrates an automatic mechanism to open delivery drone 200. In the automatic open mechanism, lateral side 213 is the sliding door that exposes interior space 200C. As alluded before, lateral side 216 includes 90 degree slide bracket 216O where slide connector 216S is attached to the top of lateral side 216. Similarly, lateral side 214 includes a second 90 degree slide bracket 214O where a second slide connector 214S attached to the top of lateral side 214. To open, in the first phase, lateral side 213 moves upward along a first direction 511 in the Z-axis. In the second phase, lateral side 213 moves in a second direction 512 parallel to the X-Y plane and rest on top of top side 213. In various embodiments of the present invention, a communication device 227 is placed inside interior space 200C near the rim of electronic section 230 and behind lateral side 213. During delivery, lateral side 213 is automatically slide to open as described in directions 511 and 512 above. As soon as lateral side 213 completely rests upon top side 211, communication device 227 is automatically stands up on stands 227L and 227R in a direction 227D along the Z-axis so that the customer can communicate with the operator. Communication device 227 may include, but not limited to, a flat screen display, a two-way camera, a speaker and a microphone. It will be noted that many open mechanism and automatic open mechanism can be interchangeably used in all three delivery drones 100, 200, and 400.

Figure 7A:
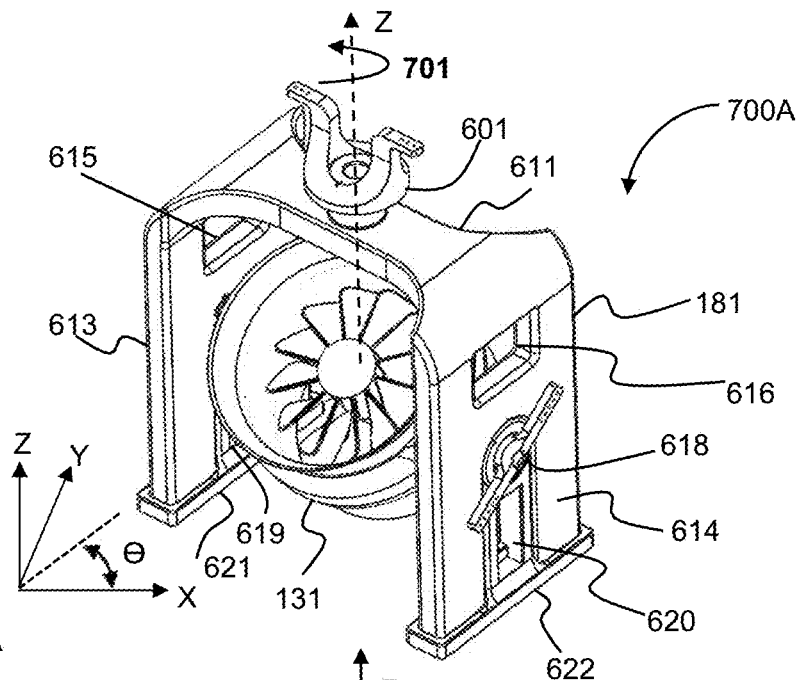
FIG. 7A illustrates a three-dimension (3D) perspective diagram of the rotation to a specific rotation angle $\Theta$ of a frame bracket of a thrust motor in accordance with an embodiment of the present invention.
Figure 7B:
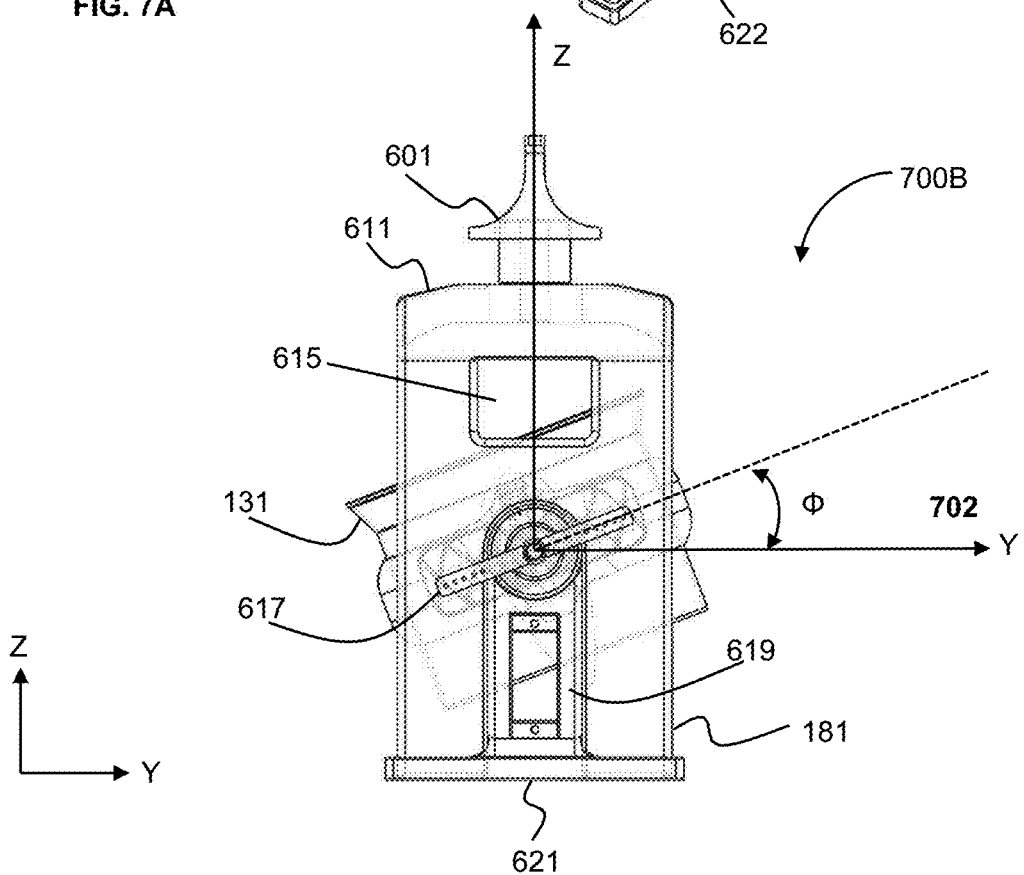
FIG. 7B illustrates a two-dimension (2D) lateral view the tilt of a thrust motor to a specific tilt angle $\phi$ in accordance with an exemplary embodiment of the present invention.

Now referring to FIG. 6A, a three-dimension (3D) perspective view of a first type of thrust motor and frame bracket 600A in accordance with an exemplary embodiment of the present invention is illustrated. In FIG. 6A and FIG. 7A-7B, thrust motor 131 is used as a non-limiting example of all thrust motors 130, 230, and 430. Thrust motor 131 is enclosed within in frame bracket 181 for safety and aerodynamic purposes. Frame bracket 181 has an inverted U– with a top side 611, lateral sides 613-614, and bottom sides 621-622. Bottom sides 621-622 form landing feet for delivery drone 100, delivery drone 200, and delivery drone 400. More particularly, top side 611 includes a rotatable connector 601 so that frame bracket 181 can be mechanically connected to electronic section 120 and freely rotate around the vertical Z direction. From top down along the Z-axis, lateral side 613 includes a first opening 615, a first tilt connector 617, and a second opening 619. Lateral side 614 includes a third opening 616, a second tilt connector 618, and a fourth opening 620. Thrust motor 131 is mechanically connected to lateral sides 613-614 via first tilt connector 617 and second tilt connector 618. With such geometrical design, thrust devices 131-142, for example, are operable to improve efficiencies by avoiding reflecting waves of neighboring thrust devices from adversely affecting the total balance and the thrust power of delivery drone 100.

Now referring to FIG. 6B, a three-dimension (3D) perspective view of another type of thrust motor and frame bracket 600B in accordance with another embodiment of the present invention is illustrated. In FIG. 6B, thrust motor 471 is used as a non-limiting example of all thrust motor 430 of delivery drone 400. Thrust motor 471 is enclosed within in frame bracket 481 for safety and aerodynamic purposes. Frame bracket 481 is a hollow cylindrical shape with a top side 641, a lateral side 642, and bottom sides 661-662. Lateral side 642 has a large front opening 643 and a rear opening 644 perfectly aligned to each other. The hollow space inside frame bracket 481, front opening 643, and rear opening 644 are the location where thrust motor 471 is attached to frame bracket 481. A first tilt connector 651 and a second tilt connector 652 mechanically secure thrust motor 471 to frame bracket 481. Bottom sides 661-662 form landing feet for delivery drone 400. More particularly, top side 641 includes a rotatable connector 630 so that frame bracket 481 can be mechanically connected to electronic section 420 and freely rotate around the vertical Z direction. Rotatable connector 630 is configured to allow frame bracket 481 to rotate 360° freely on the X-Y plane so that delivery drone 400 can turn around itself around the Z-axis and to fly lateral side 413 or 415 first. Please refer back to FIG. 4. Rotatable connector 630 further includes a base 632 and a male connector 631 that connects frame bracket 481 to bottom side 412 of delivery drone 400. With such geometrical design, thrust devices 471-474, for example, are operable to improve efficiencies by avoiding reflecting waves of neighboring thrust devices from adversely affecting the total balance and the thrust power of delivery drone 400.

Referring next to FIG. 7A, a three-dimension (3D) perspective diagram 700A illustrating the rotation of a thrust motor in accordance with an exemplary embodiment of the present invention is presented. It is noted that thrust motor 131 is used as a non-limiting example of how a thrust motor rotates only. Thrust motors 131-142, 231-264, and 471-474 are configured to operate in the same rotation and tilt principles described in FIG. 7A and FIG. 7B respectively. As shown in an exemplary embodiment of FIG. 7A, frame bracket 181 can be controlled to rotate 360° around the Z-axis in a rotation motion 701 to form a specific angle $\Theta$ with respect to the X-axis, where $0° \leq \Theta \leq 360°$. In various embodiments of the present invention, each frame bracket 181 of thrust motors 131-142 can independently rotated so that delivery drone 100 can turn around itself in a direction 213T and move forward with edge 117 first. Other commercially available thrust motors that serve the objects are within the scope of the present invention.

Similarly, referring to FIG. 7B, a two-dimension (2D) lateral view illustrating the tilt of a thrust device is presented. As shown in FIG. 7B, thrust motor 131 primarily shows top side 611 with rotatable connector 601, lateral side 613 with first opening 615, first tilt connector 617, third opening 619, first landing feet 621. As can be seen in FIG. 7B, thrust motor 131 is tilted at an angle $\phi$ with respect to the Y-axis, where $0° \leq \phi \leq 45°$. In various embodiments of the present invention, each thrust motor 131 of thrust devices 131-142 can independently tilted so that delivery drone 100 can lift off vertically in a direction 111U, land in a direction 111D, or move forward with edge 117 leading, or hover at a balcony at the delivery destination. The tilts for vertical take-off of delivery drones 100 and 200 are described above. Because of the rotation e and tilt 1 of thrust motors 131-142, 231-264, 471-474, delivery drones 100, 200, and 400 can be operated as described in FIG. 11-FIG. 21.

Figure 8:
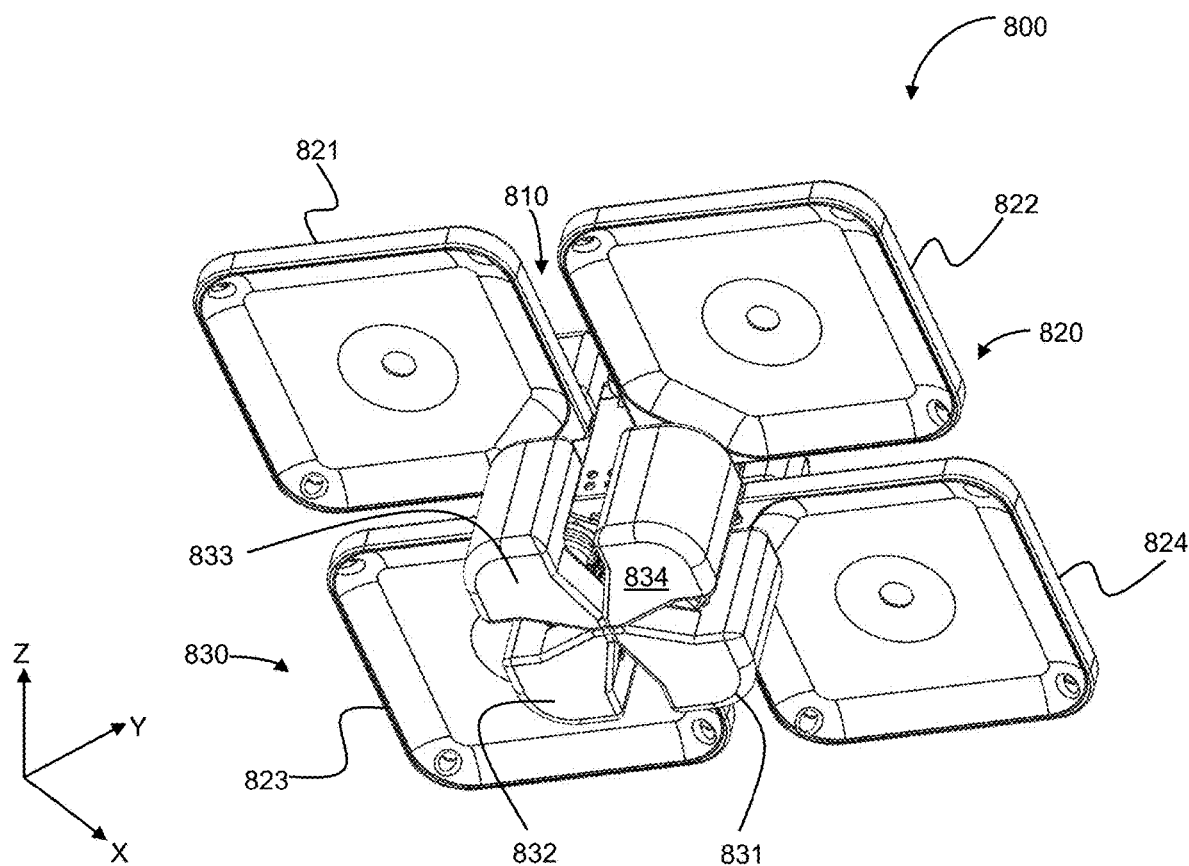
FIG. 8 is a three-dimension (3D) bottom view of an airbag system for the delivery drone in accordance with an exemplary embodiment of the present invention.

FIG. 1-FIG. 7B above of the present invention disclose the mechanical structures and operations of delivery drones 100, 200, and 400. FIG. 8-FIG. 10 will disclose safety features for delivery drones 100, 200, and 400.

Now referring next to FIG. 8, a three-dimension (3D) diagram illustrating an airbag system 800 for delivery drones 100, 200, and 400 described above in accordance with an exemplary embodiment of the present invention is presented. In various embodiments of the present invention, airbag system 800 includes a top airbag portion 810, a middle airbag portion 820, and a bottom airbag portion 830. As seen from the bottom view, bottom airbag portion 830 includes a first bottom airbag 831, a second bottom airbag 832, a third bottom airbag 833, and a fourth bottom airbag 834, each dedicated to protect one edge 117 of bottom side 112 of delivery drone 100. Geometrically, first bottom airbag 831, second bottom airbag 832, third bottom airbag 833, and fourth bottom airbag 834 each has a shape of a flower petal designed to cover bottom side 112 at four edges 117 of delivery drone 100. Middle airbag portion 820 has a larger surface area than top airbag portion 810. Middle airbag portion 820 includes a first middle airbag 821, a second middle airbag 822, a third middle airbag 823, and a fourth middle airbag 824, each designed as parachute to drastically slow the free fall of delivery drone 100 when array of thrust motor 230 substantially fails. In one exemplary embodiment of the present invention, airbag system 800 is stored inside interior space 100C at four corners of edges 117.

Figure 9A:
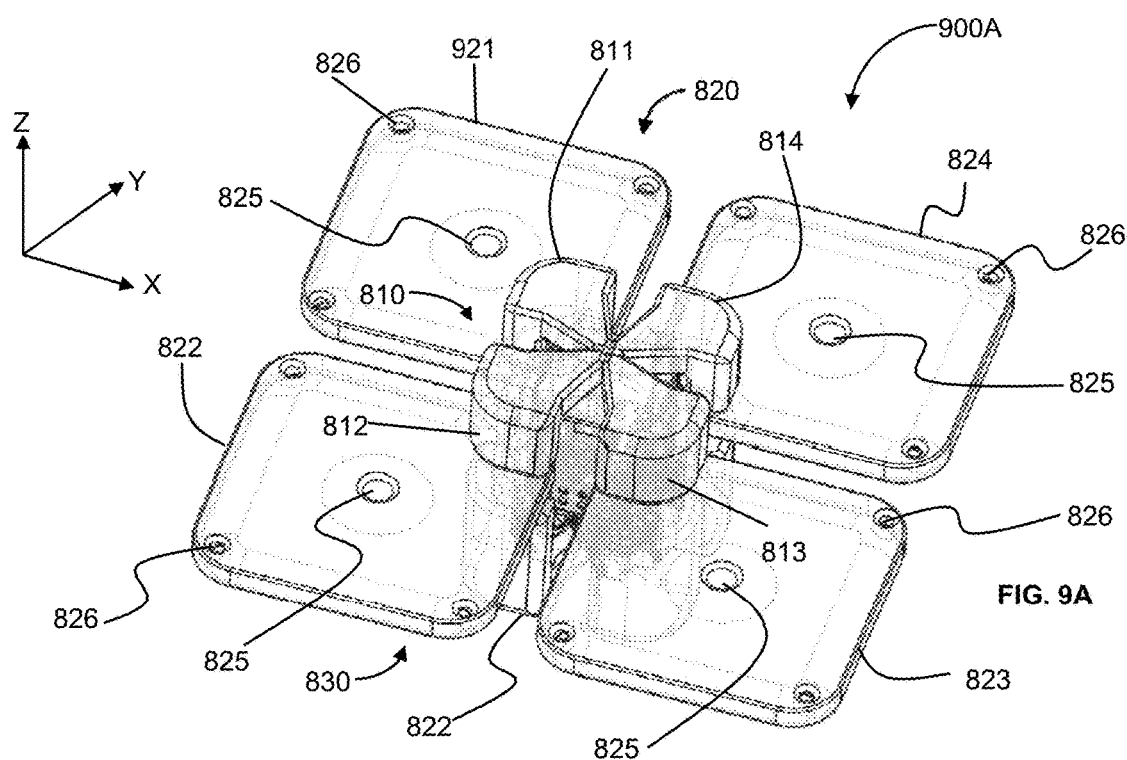
FIG. 9A is a three-dimension (3D) top view of an airbag system for the delivery drone in accordance with an exemplary embodiment of the present invention.
Figure 10:
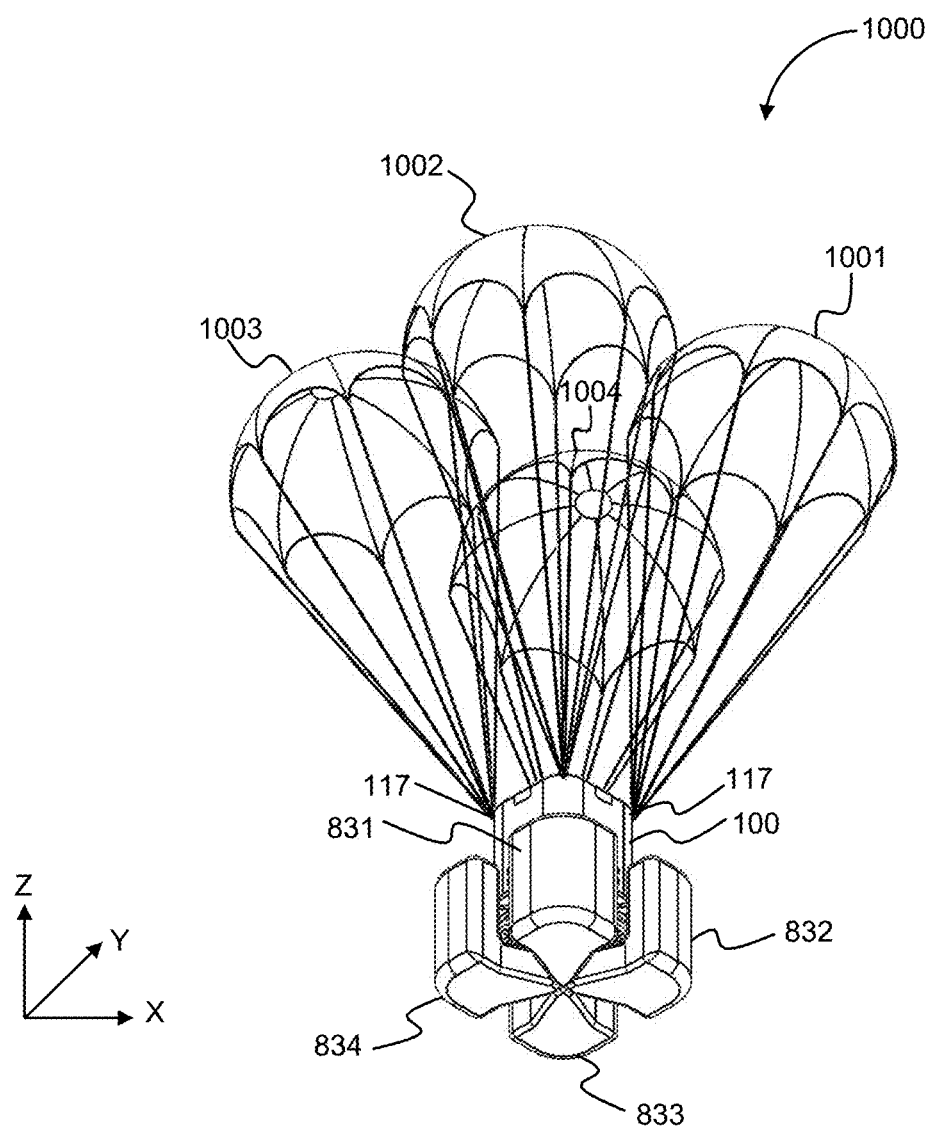
FIG. 10 is a three-dimension (3D) perspective view of the safety system that includes both airbag system and parachute system for the delivery drone in accordance with an exemplary embodiment of the present invention.

Continuing with airbag system 800, FIG. 9A illustrates a three-dimension 3D top view 900A of airbag system 800. As seen, top airbag portion 810 includes a first top airbag 811, a second top airbag 812, a third top airbag 813, and a fourth airbag 814, each has a shape of a flower petal designed to protect four top edges 117 of delivery drone 100. Furthermore, middle airbag section 820 has a rectangular shape with a center hole 825 and three perimeter holes 826 designed to aerodynamically balance the free fall—avoiding being flipped upside down—and create a soft landing for delivery drone 100. Top airbag portion 810 and bottom airbag portion 830 do not only function as cushions but also act as buoys when delivery drone 100 accidentally falls into a body of water.

Figure 9B:
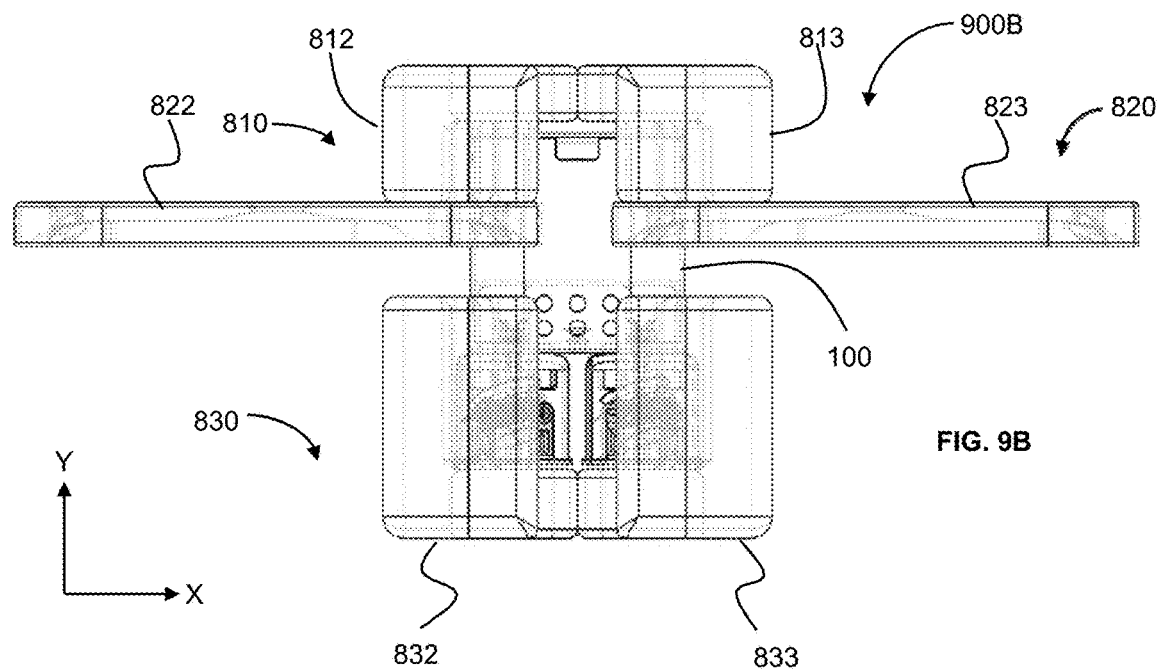
FIG. 9B is a two-dimension (2D) lateral view of an airbag system for the delivery drone in accordance with an exemplary embodiment of the present invention.

Referring to FIG. 9B, a lateral view 900B of airbag system 800 in accordance with an exemplary embodiment of the present invention is illustrated. As alluded above, airbag system 800 include top airbag portion 810 designed to protect top edges 117, middle airbag portion 820 designed as a parachute to prevent hard crashing of delivery drone 100, and bottom airbag portion 830 designed to protect bottom edges 117. Airbag system 800 can be stored in interior space 100C at the four corners of edges 117. In operation, airbag system 800 is triggered when electronic section 220 receives the following signals from the sensors: (1) when delivery drone 100 falls at a faster velocity than a predetermined velocity, and/or (2) when more than one thrust motors 131-142 fail that delivery drones 100, 200, 400 cannot fly anymore. Once airbag system 800 of the present invention is activated, it substantially envelops delivery drone 100 to protect delivery drone 100 and the packages inside.

Next, referring to FIG. 10, a three-dimension (3D) perspective view of a combined safety system 1000 for delivery drones 100, 200, and 400 in accordance with an exemplary embodiment of the present invention is illustrated. Combined safety system 1000 includes a set of parachutes 1001, 1002, 1003, and 1004 located at four edges 117 of delivery drone 100. For soft landing purpose, combined safety system 1000 also includes bottom airbag portion 830 that includes first bottom airbag 831, second bottom airbag 832, third bottom airbag 833, and fourth bottom airbag 834 originated from the respective bottom of four edges 117. In operation, when delivery drone 100 fails at an altitude higher than a predetermined altitude $H_p$, electronic section 120 activates combined safety system 1000 instead of safety system 800 as described in FIG. 8 and FIG. 9A-FIG. 9B. Combined safety system 1000 provides safety to delivery drone 100 and the merchandise when airbag system 800 cannot achieve. In some aspects of the present invention, combined safety system 1000 can be pre-installed to delivery drones 100, 200, and 400 in lieu of safety system 800 when the operators have a priori knowledge that this delivery drone is dedicated to fly at a high altitude significantly higher than the altitude H. In other aspects of the present invention, both safety system 800 and high elevation system 1000 can be both installed in delivery drones 100, 200, and 400. It is the function of electronic section 120 to decide which system to activate based on the altitude information obtained from altitude sensors.

With such novel arrangements as described in FIG. 1-FIG. 10 above, the delivery drones of the present invention achieve the following objects: (a) avoid fatal propeller accidents to properties and people during flight; and (b) fly on an optimal flight route along a safe virtual infrastructure to achieve safety and efficiencies; (c) achieve versatile functions such as delivering parcels and/or transporting peoples from one place to another; (d) the arrangement of thrust motors in the N×M array format provides efficiencies and versatilities, e.g., vertical take-off and landing (VTOL); forward, backward, turning, rotating flights in all directions with ease; and (e) achieve safety for people, properties, and the merchandises when the delivery drone fails.

Now FIG. 11 to FIG. 18 describe the virtual infrastructure of the present invention by which delivery drones 100, 200, and 400 are programmed to fly. At the first blush, the virtualized infrastructure system of the present invention is a three-dimension (3D) coordinated map that includes layers of virtual streets along which delivery drones 100, 200, or 400 are programmed to fly. The layers of virtual streets are streets digitally copied from those of the Global Positioning System (GPS) map, both having the same X-Y-Z Cartesian coordinate. Then the digitally copied GPS streets, or the virtual street, are elevated to a pre-calculated safe altitude H and multiplied into many layers of different altitude H. The purpose of the virtualized infrastructure of the present invention is to achieve the following objectives: (1) to provide a safe route for delivery drones 100, 200, and 400; (2) to avoid unwanted collision and traffic jams that hamper efficiencies and increase costs; and/or (3) to deliver packages right to the hands of customers who live in single-storied residential houses or high-rise condominiums.

Figure 11:
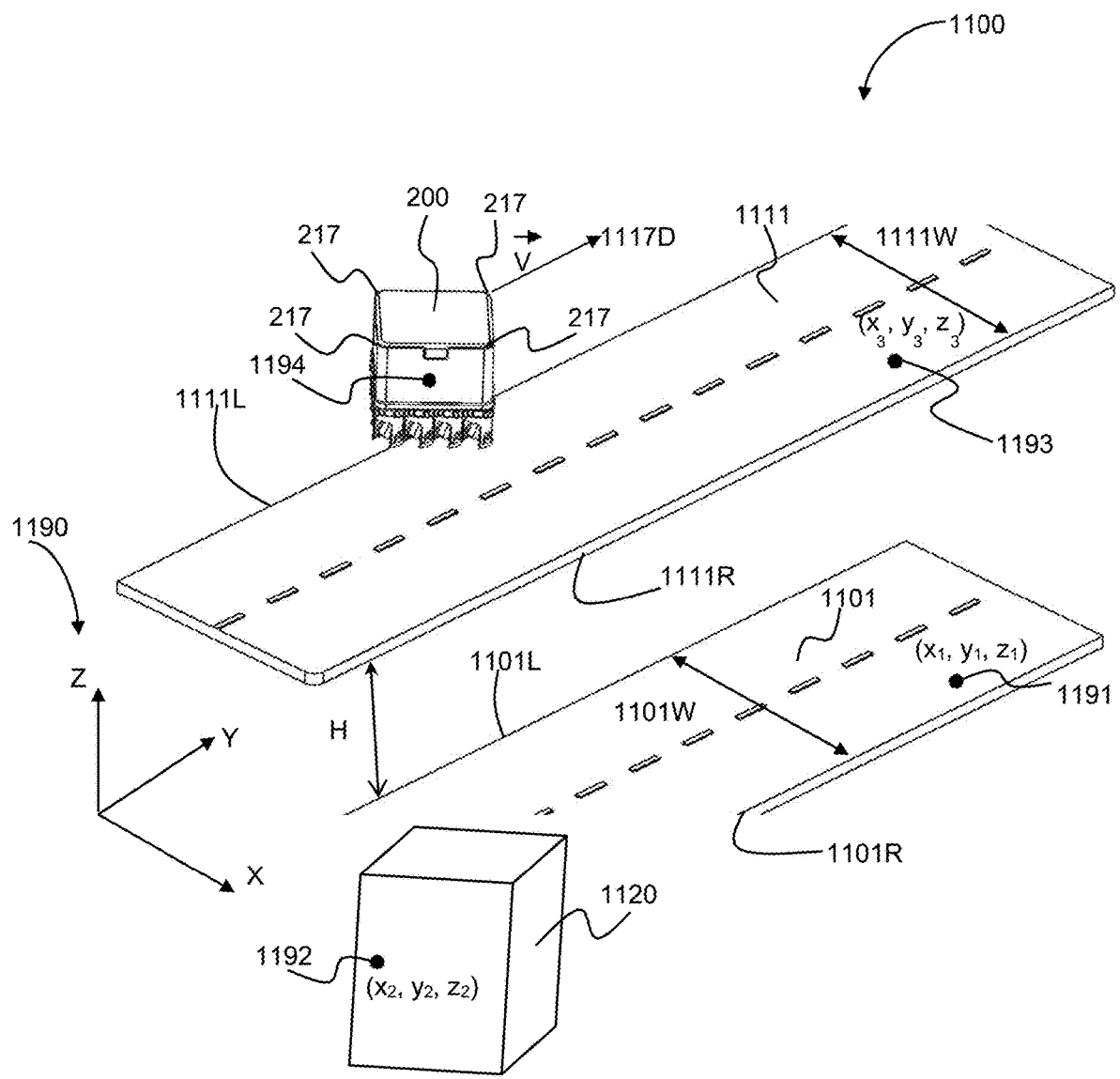
FIG. 11 is a three-dimension (3D) perspective view of a virtualized infrastructure along which the delivery drone is flown in accordance with an exemplary embodiment of the present invention.

Referring now to FIG. 11, a three-dimension (3D) perspective view of a virtualized infrastructure 1100 along which delivery drone 200 is programmed to fly in accordance with an exemplary embodiment of the present invention is illustrated. Virtualized infrastructure 1100 includes a Global Positioning System (GPS) map street ("GPS-based street") 1101 and a virtual street 1111. Virtual street 1111 is a digital copy of GPS street 1101 bit by bit and elevated to a pre-determined altitude H. It is well known in the art that GPS street 1101 is the well-known street map where cars, buses, trains, and people are using every day to navigate from point A to point B. Virtual street 1111 is a digital street created by a software program that will be described later in FIG. 20. GPS-based street 1101 is comprised of a plurality of digital points 1191 each having a coordinate $(X_1, Y_1, Z_1)$ with reference to X-Y-Z Cartesian coordinate system 1190. An exemplary feature 1120 inside the 3D model of the area is also comprised of a plurality of digital points 1191 each having a coordinate $(X_1, Y_1, Z_1)$ with reference to X-Y-Z Cartesian coordinate system 1190. Virtual street 1111 is also comprised a plurality of digital points 1192 each having a coordinate $(X_3, Y_3, \text{and } Z_3)$ with respect to X-Y-Z Cartesian coordinate system 1190. In the present disclosure, these digital points are called point X-Y-Z Cartesian coordinates. Delivery drone 200 is has a single coordinate $(X_i, Y_i, \text{and } Z_i)$ with respect to X-Y-Z Cartesian coordinate system 1190. The pre-determined altitude H is calculated from virtualized infrastructure 1100 that also takes into consideration of the 3D scan image of the area, such as feature 1120. Since virtual street 111 is digitally copied point by point from GPS-based street 1101, the coordinate $X_3 = X_1 + H$. Similarly, $Y_3 = Y_1 + H$, and $Z_3 = Z_1 + H$. Accordingly, GPS-based street 1101 has a left boundary 1101L, a right boundary 1101R, and a width 1101W. Virtual street 1111 is digitally copied from GPS-based street 1101 having the same left boundary 1111L, a right boundary 1111R, and a width 1111W within which delivery drone 200 is programmed to fly edge 217 first in a direction 1117D and at velocity V. As will be shown in FIG. 19-FIG. 21 that exemplary delivery drone 200 is equipped with edge sensors that can sense boundaries 1111L and 1111R. From this information, electronic section 220 guides delivery drone 200 to fly within width 1111W of virtual street 1111.

It will be noted that in case GPS map and the 3D scan model of the area do not have the same coordinates system, the two coordinate systems can be readily converted. For example, GPS map uses latitude, longitude, and altitude in a spherical coordinate system; whereas 3D scan model uses the X-Y-Z Cartesian coordinate. In addition, points X-Y-Z Cartesian coordinates on the two maps can be geo-referenced so that they can be tied together and have common X-Y-Z Cartesian coordinate system 1190.

For the sake of simplicity, it will be also noted that, in FIG. 12-FIG. 18 of the present disclosure, virtual streets 12111-1812; delivery drones 100, 200; and GPS-based streets 1201-1801 all have the same X-Y-Z Cartesian Coordinate system 1290, 1390, 1490, 1590, 1690, 1790, and 1890, respectively.

Figure 12:
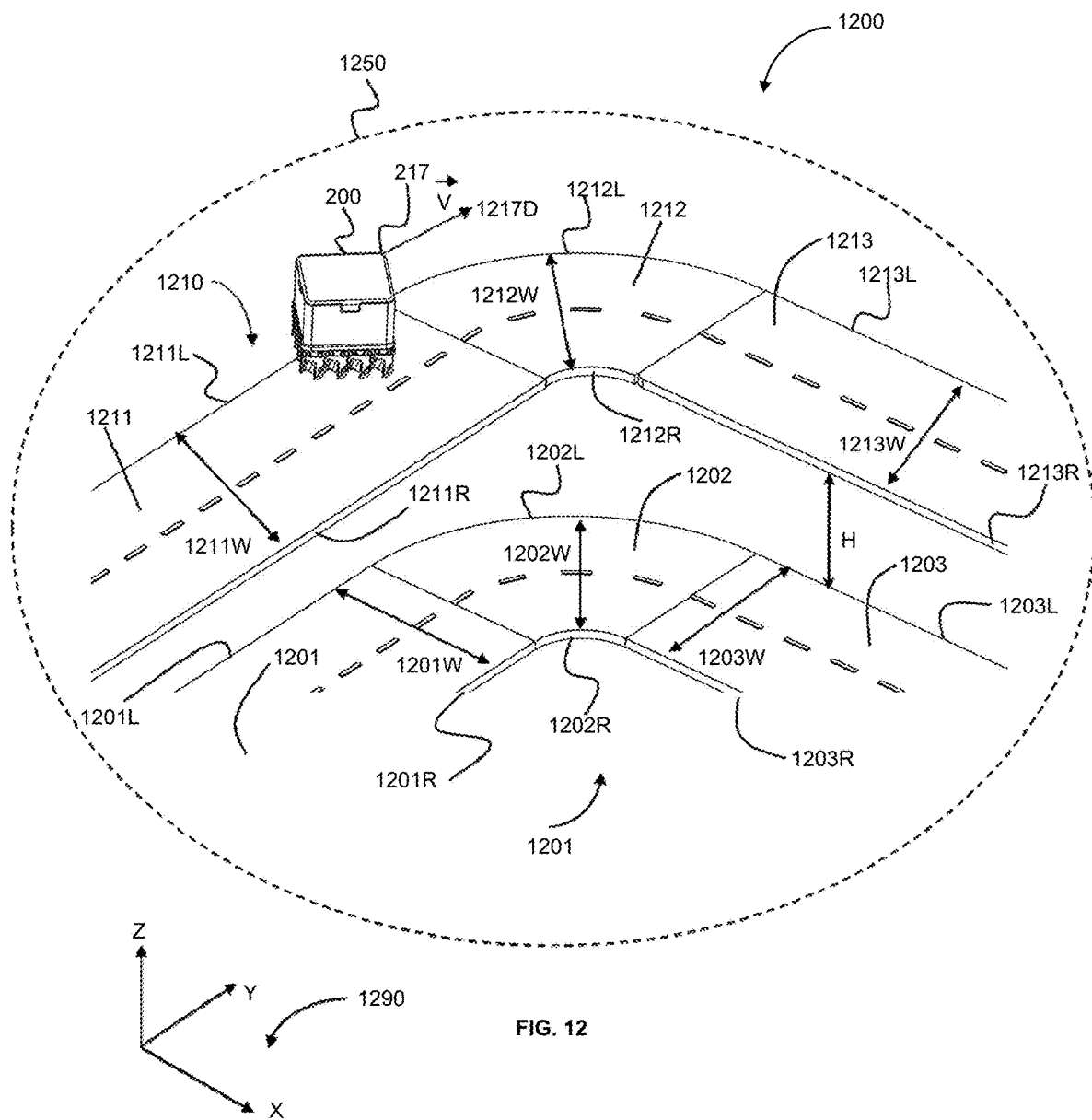
FIG. 12 is a three-dimension (3D) perspective view of a geographical cell including the virtualized infrastructure where the delivery drone is programmed to fly in accordance with an exemplary embodiment of the present invention.

Next referring to FIG. 12, a three-dimension (3D) perspective view of a virtualized infrastructure 1200 in accordance with an exemplary embodiment of the present invention is illustrated. As described above, virtualized infrastructure 1200 is a software created streets based on the physical streets encoded in the GPS map and the 3D scan of the geographical cell 1250 where delivery drones 100, 200, and/or 400 operate. It is noted in the present description that a city, a state, or an area where delivery drones 100, 200, and/or 400 operate can be divided into multiple geographical cells 1250. Within the boundary of one geographical cell 1250, one or a fleet of delivery drones 100, 200, and/or 400 are programmed to operate. The physical streets and virtual streets as shown in FIG. 12 are used as non-limiting example of geographical cell 1250. It is understood that geographical cell 1250 contains a complex network of GPS streets and 3D scan model of the area. For example, geographical cell 1250 contains the entire GPS map of San Francisco or Ho Chi Minh City. The state of California or Vietnam can be divided into multiple geographical cells 1250 where delivery drones 100, 200, and/or 400 are programmed to operate. All features inside geographical cell 1250 share the same X-Y-Z Cartesian coordinate system 1290.

Continuing with FIG. 12, a GPS-based street 1200P is comprised of a first section 1201, a curved section 1202, and a final section 1203—together forming a right turn street. First section 1201 has a left boundary 1201L, a right boundary 1201R, and a width 1201W. Similarly, curved section 1202 has a left boundary 1202L, a right boundary 1202R, and a width 1202W. Final section 1203 a left boundary 1203L, a right boundary 1203R, and a width 1203W. As discussed in FIG. 11, virtual street 1210 is an exact digital replica of GPS-based street 1200P but elevated to a safe altitude H. Again, virtual street 1210 is created by a software program described in FIG. 20. As such, virtual street 1210 is comprised of a virtual first section 1211, a virtual curved section 1212, and a virtual final section 1213. Virtual first section 1211 has a left boundary 1211L, a right boundary 1211R, and a width 1211W. Similarly, curved section 1212 has a left boundary 1212L, a right boundary 1212R, and a width 1212W. Virtual final section 1213 a left boundary 1213L, a right boundary 1213R, and a width 1213W. Delivery drone 200 is programmed to fly edge 217 first along virtual street 1210 at a velocity V in a direction 1217D from virtual first section 1211 to virtual curved section 1212 and finally makes a right turn onto virtual final section 1213. During this journey, delivery drone 200 is contained to fly within the boundaries having width 1211W, 1212W, and 1213W. Sensors (not shown) in delivery drone 200 senses boundaries 1211L, 1211R, 1212L, 1212R, 1213L, and 1213R. Electronic section 220 controls thrust motors 231-264 to keep delivery drone 200 inside these boundaries.

Figure 13:
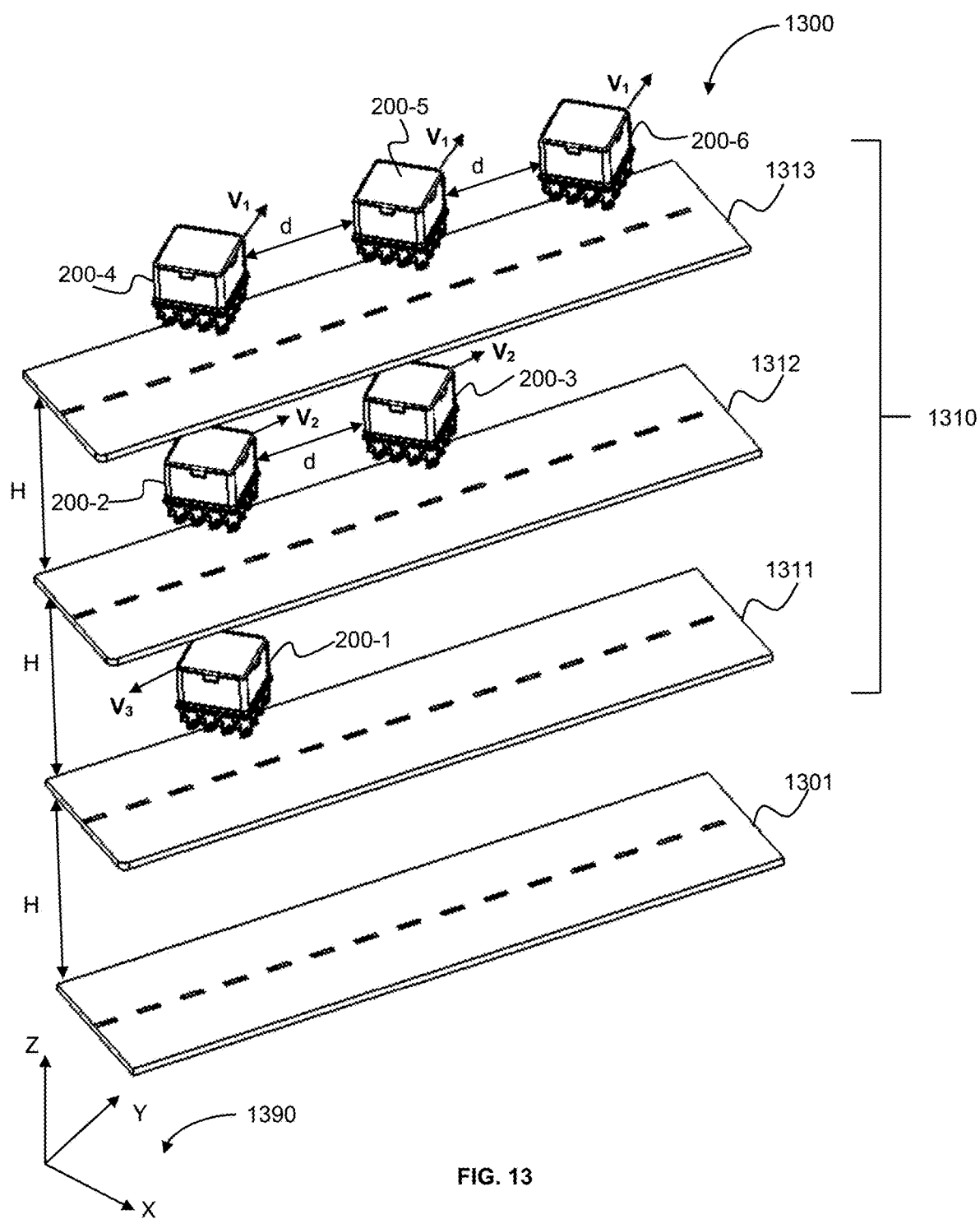
FIG. 13 is a three-dimension (3D) perspective view of a virtualized infrastructure that includes a layers of virtual streets where a fleet of delivery drone boxes are programmed to fly in accordance with an exemplary embodiment of the present invention.

Referring next to FIG. 13, a three dimension (3D) perspective view of the multi-leveled streets of a virtualized infrastructure 1300 in accordance with an exemplary embodiment of the present invention is illustrated. Virtualized infrastructure 1300 includes a first GPS-based-street 1301, a first virtual street 1311, a second virtual street 1312, and a third virtual street 1313. All have the same X-Y-Z Cartesian coordinate system 1390. First virtual street 1311 is located at an altitude H from first GPS-based street 1301. Second virtual street 1312 is located at an altitude H from first virtual street 1311. Third virtual street 1313 is located at an altitude H from second virtual street 1312. In some embodiments of the present invention, altitude H between virtual streets can be different depending on the physical structure of the geographical cell of the area. In various aspects of the present invention, more than one delivery drones can be used to deliver packages to different customers who live in the same building, condominium, or neighborhood. As shown in FIG. 13, delivery drones 200-1 to 200-6 are flown at the same time on either the same virtual streets 1311, 1312, and 1313 respectively. Delivery drone 201-1 uses first virtual street 1311. Delivery drones 200-2 and 200-3 use second virtual street 1312 at a safe distance d from one another. Delivery drones 200-4 to 200-6 use third virtual street 1313 at the safe distance d from one another. Distance d depends on the speed V of each delivery drones 201-1 to 201-6.

As shown in FIG. 13, after a delivery is completed, empty delivery drone 200-1 returning to base (warehouse or starting point or first address) is programmed to returned on a different virtual street than delivery drones 200-2, 200-3, 200-4, 200-5, and 200-6. In addition, delivery drones with different velocities V (velocity V including direction) are only allowed in different virtual streets. Namely, delivery drone 200-1, on the way home after a successful delivery, is programmed to fly edge 217 first on first virtual street 1311 at a velocity $V_3$ in an opposite direction. Delivery drones 200-2 and 200-3 are programmed to fly edge 217 first toward the destination on second virtual street 1312 at a velocity $V_2$. Delivery drones 200-4, 200-5, and 200-6 are programmed to fly edge 217 first toward the destination on third virtual street 1313 at a velocity $V_3$. In one aspect of the present invention, $V_1 < V_3 < V_2$. That is, delivery drones flying at different velocities and different directions will not be allowed to fly on the same virtual street of the present invention. However, in other aspects of the present invention, when all velocities are the same, $V_1 = V_3 = V_2$, the number of delivery drones on course will determine which virtual streets they will be assigned to.

Figure 14:
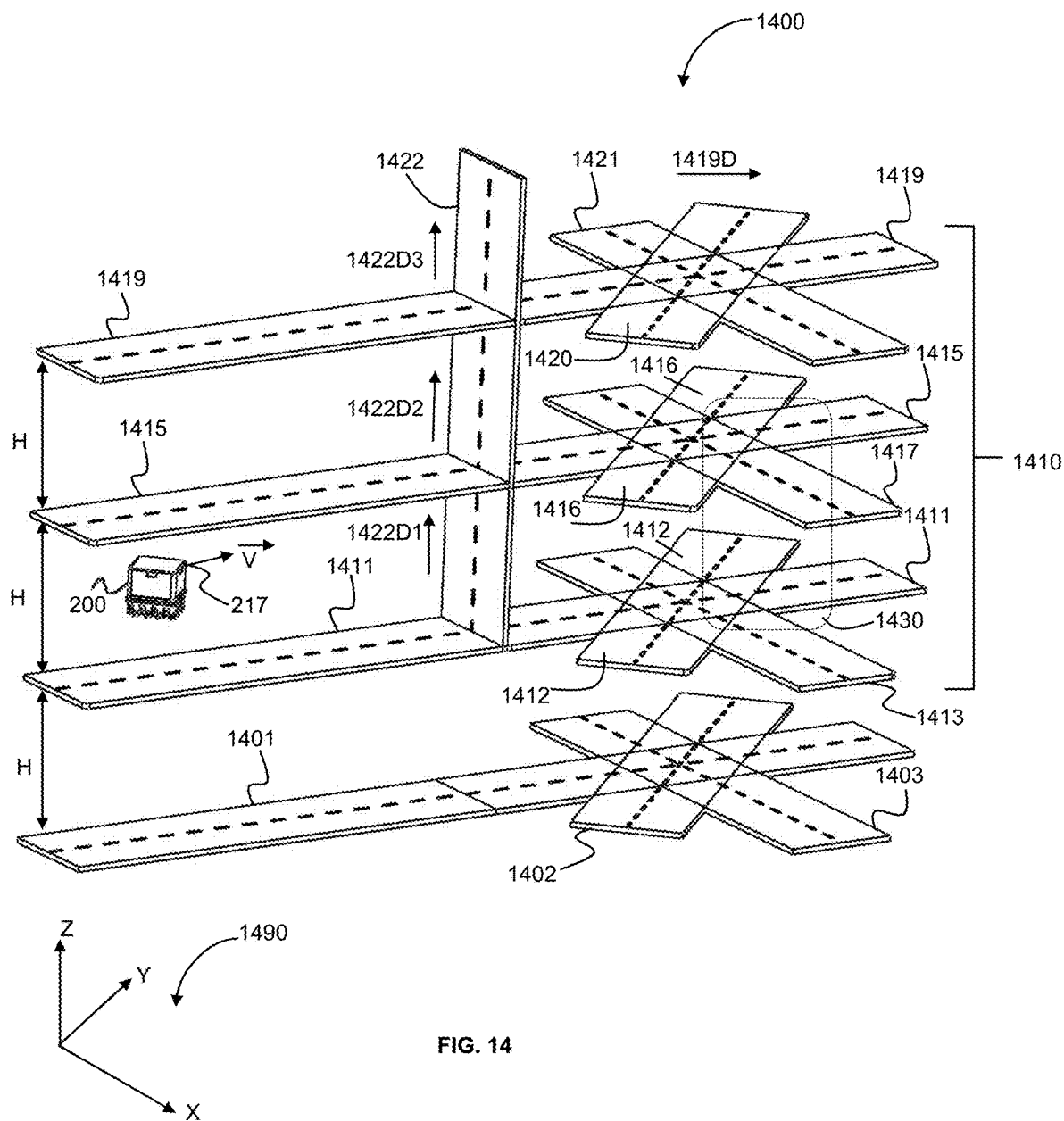
FIG. 14 is a three-dimension (3D) perspective view of the virtualized infrastructure that includes a vertical virtual street designed to by-pass an intruding obstacle in accordance with an exemplary embodiment of the present invention.

Referring next to FIG. 14, a three dimension (3D) perspective view of the multi-leveled streets of a virtualized infrastructure 1400 involving cross-sections in accordance with an exemplary embodiment of the present invention is illustrated. First, it will noted again that all entities within FIG. 14 including GPS-based street 1401, virtual streets 1411-1419, and an obstacle 1430 share the same X-Y-X Cartesian coordinate 1490. A GPS-based street 1401 includes a first cross street 1402 and a second cross street 1403. In various embodiments of the present invention, virtual streets 1411, 1415, and 1419 at altitudes H, 2H and 3H respectively are generated from GPS-based street 1401 for delivery drone 200. At altitude H, virtual street 1411 also includes a first virtual cross section 1412 and a second virtual section 1413. At altitude 2H, virtual street 1415 also includes a first virtual section 1416 and a second virtual section 1417. At altitude 3H, virtual street 1419 also includes a first virtual section 1420 and a second virtual section 1421. However, in some situations when obstacle 1430 such as a tower crane, a protruding mountain, trees, etc. making the flying of delivery drone 200 along first or second virtual cross sections 1411, 1412, 1415, and 1416 of virtual streets 1411 and 1415 unsafe, virtualized infrastructure 1400 also includes a vertical virtual street 1422 so that delivery drone 200 can fly vertically along directions 1422D1, 1422D2, and 1422D3 to a safer altitude at 3H. At that safe altitude 3H, delivery drone 200 flies along direction 1419D on the second segment of virtual street 1419. There, delivery drone 200 can either make a left turn to first virtual cross section 1421 or a right turn to second virtual cross section 1421. In some aspects of the present invention, when first cross section 1402 and second cross section 1403 have different altitudes than GPS based street 1401, virtualized infrastructure 1400 flattens out virtual cross sections 1420 and 1421 at the safe altitude 3H to simplify the flight of delivery drone 200.

Figure 15:
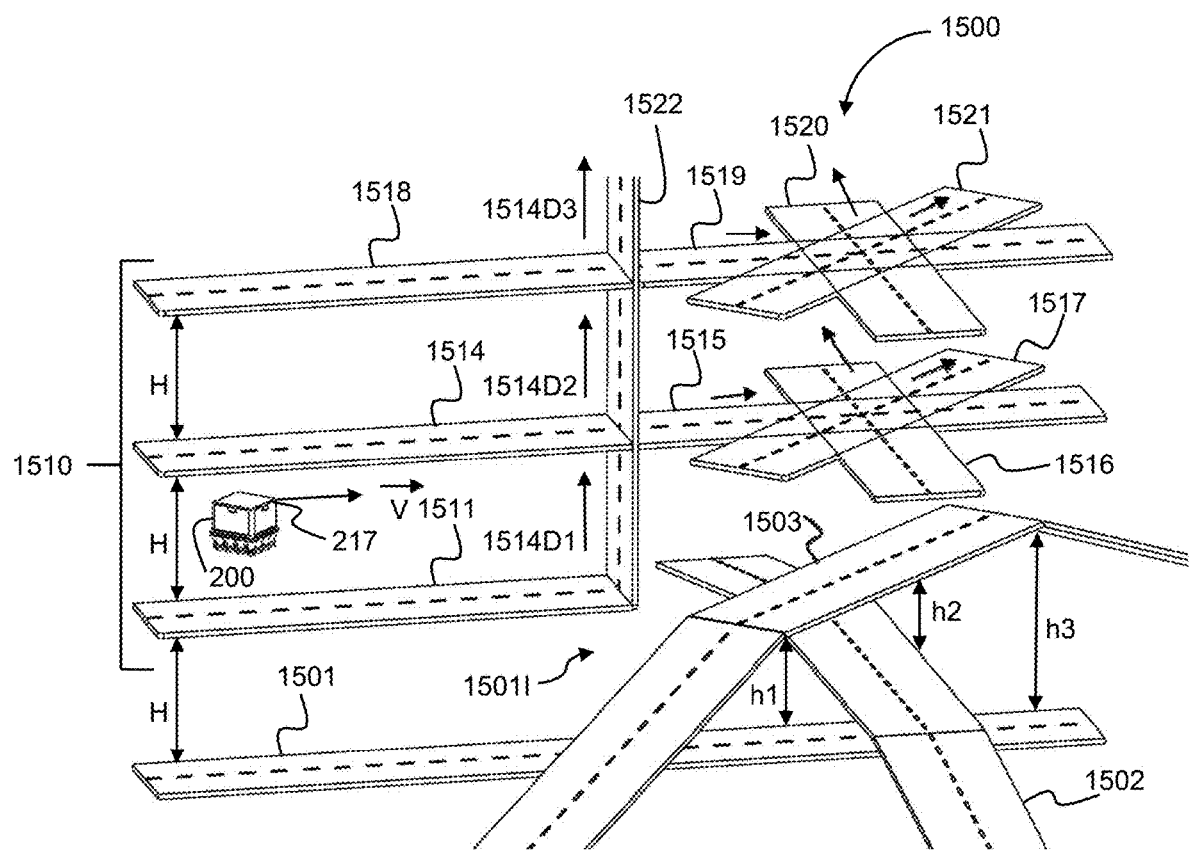
FIG. 15 is a three-dimension (3D) perspective view of a virtualized infrastructure that includes a vertical virtual street to by-pass a permanent multi-leveled freeway interchange in accordance with an exemplary embodiment of the present invention.

Now referring to FIG. 15, a three dimension (3D) perspective view of the multi-leveled streets of a virtualized infrastructure 1500 involving multi-leveled highway interchange in accordance with an exemplary embodiment of the present invention is illustrated. First, it will noted again that all entities within FIG. 15 including a GPS-based street 1501, virtual streets 1511-1518, and a vertical virtual street 1522 share the same X-Y-Z Cartesian coordinate 1590. GPS-based street 1501 belongs to a high way interchange 1501I which includes a first level highway 1502 and a second level highway 1503. Highway interchange 1501I is a multi-leveled highway interchange network that can have a single point urban interchange (SPUI), a trumpet interchange, a diamond interchange, and a clover leaf interchange, or a diamond interchange. In any interchange formation, GPS-based street 1501 is underneath first level highway 1502 at an altitude $h_1$, and second level highway 1503 at an altitude $h_3$. First level highway 1502 is at an altitude $h_2$ lower than second level highway 1503. However, in some situation, the sum of $h_1$ and $h_2$ is not equaled because the surface of first level highway 1503 can be slanted upward or downward. When the altitudes $h_1$, $h_2$, and $h_3$ of the freeway interchange are greater than the safe altitude H of virtual street 1511, virtualized infrastructure 1500 shall include vertical virtual street 1522 designed to allow delivery drone 200 to fly vertically upward in the Z-direction to avoid highway interchange 1501I. In case virtual street 1514 is still not high enough because the altitude $h_3$ is sufficiently close to the total altitude 2H ($h_3 \sim 2H$). The altitude of eighteen wheelers with containers may cause danger to delivery drone 200. Delivery drone 200 shall be programmed to move upward along 1514D1 and 1514D2 to fly along a third virtual street 1519 where delivery drone 200 can turn left on a first virtual cross street 1520 or turn right on a second virtual cross street 1521.

In some aspects of the present invention, virtualized infrastructure 1500 flattens out first virtual cross street 1520 and second virtual cross street 1521 at the safe altitude 3H to simplify the flight of delivery drone 200. As such different altitudes $h_1$, $h_2$, and $h_3$ do not exist between third virtual street 1518 and first virtual cross street 1520 and second virtual cross street 1521.

Figure 16:
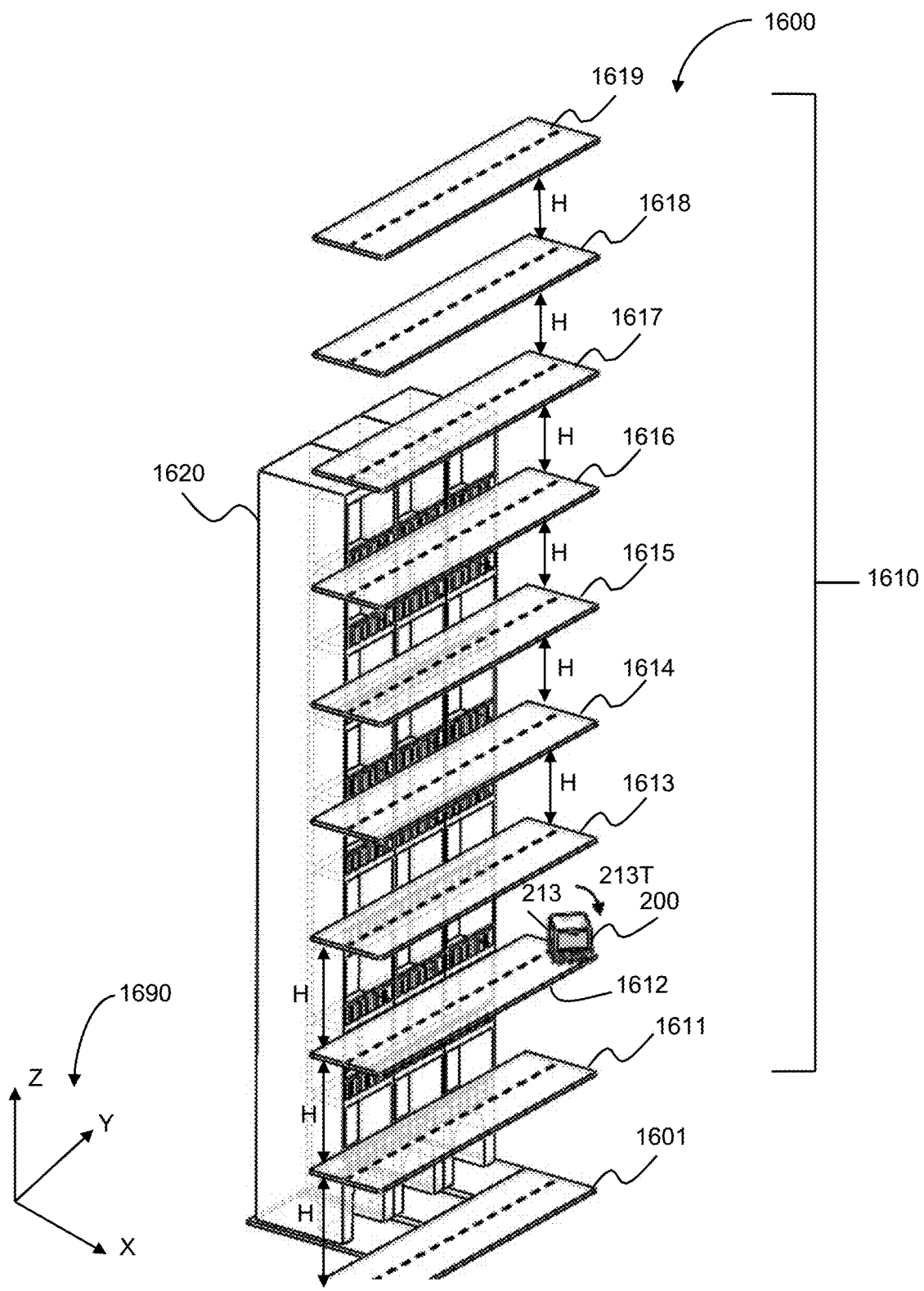
FIG. 16 is a three-dimension (3D) perspective view of a high-rise condominium and the multiple virtual street layers of the virtualized infrastructure by which the delivery drone can conveniently deliver the packages to customers on different floors in accordance with an exemplary embodiment of the present invention.

FIG. 16 illustrates a situation where delivery drone 200 approaches a high-rise condominium destination. As alluded before, altitude H between virtual streets 1610 can be adjusted constantly depending on the physical structure of the geographical cell where delivery drone 200 is operated. In FIG. 16, the altitude H is adjusted to the altitude of the stories of a high rise condominium. First, it will noted again that all entities within FIG. 16 including a GPS-based street 1601, virtual streets 1611-1619, and a condominium 1620 share the same X-Y-Z Cartesian coordinate 1690.

Still referring to FIG. 16, a three-dimension (3D) perspective view of a virtualized infrastructure 1610 of a high rise condominium 1620 is illustrated. Virtualized infrastructure 1600 includes a first GPS-based street 1601, a first virtual street 1611, a second virtual street 1612, a third virtual street 1613, a fourth virtual street 1614, a fifth virtual street 1615, a sixth virtual street 1616, an seventh virtual street 1617, an eighth virtual street 1618, and a ninth virtual street 1619, all at an altitude H from one another. It will be noted that the number of virtual streets can be set to any flight-able altitude of delivery drone 200. When delivery drone 200 approaches the destination including GPS-address and a specific altitude, it slows down and turns to lateral side 213 in direction 213T using thrust motors 231-264 as described in FIG. 1-FIG. 4. There, the customer can conveniently pick up the package.

A close-up view of FIG. 16 showing that on second virtual street 1612 where delivery drone 200 is about to deliver a package. Before reaching the destination at the third floor on second virtual street 1612, delivery drone 200 is moving edge 217 first. Upon arrival at the correct floor on third virtual street 1612 and the exact condominium number, delivery drone 200 slows down and makes a full stop to a hovering state. Finally, delivery drone 200 rotates on itself in 213T clockwise direction in so that lateral side 213 is facing the customer. The 213T turn mechanism of delivery drone 200 has been described in FIG. 1-FIG. 10 above.

Figure 17:
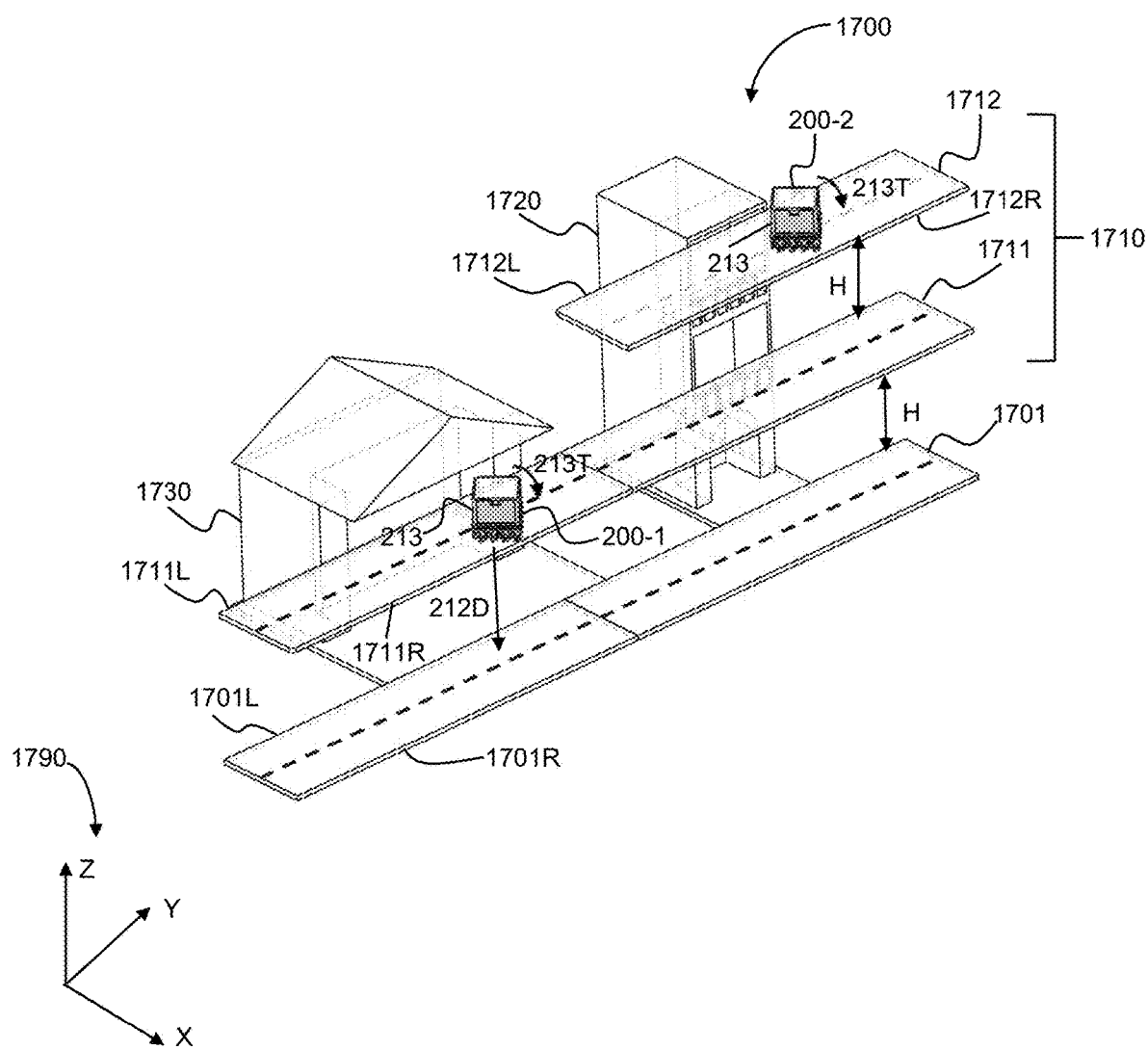
FIG. 17 is a three-dimension (3D) perspective view of a high-rise condominium and a single-storied residential house and multiple virtual street layers by which the delivery drones can conveniently deliver the packages to customers in accordance with an exemplary embodiment of the present invention.

Referring next to FIG. 17, a perspective view of a high rise condominium 1720 and a single-storied residential house 1730 and the multiple street layers 1710 of the virtualized infrastructure 1700 along which delivery drones 200-1 and 200-2 can conveniently deliver the packages to customers at different levels and different locations in accordance with an embodiment of the present invention is illustrated. First, it will noted again that all entities within FIG. 17 including a GPS-based street 1701, virtual streets 1711-1712, a high-rise condominium 1720, and a single-storied residential house 1730 share the same X-Y-Z Cartesian coordinate 1790. Virtualized infrastructure 1700 of the present invention includes a 3D scan of high rise condominium 1720 and single-storied residential house 1730. Virtualized infrastructure 1700 also includes a GPS-based street 1701, a first level virtual street 1711, and a second level virtual street 1712. As discussed in FIG. 8A-FIG. 8C, delivery drone 200-2 can make a delivery to a second floor of high-rise condominium 1720 along first virtual street 1711 to the exact room and balcony. There, delivery drone 200-2 can make a 45° 213T rotation to its lateral side 213 and hovering parallel to the balcony so that the customer can pick up the package by either mechanism described in FIG. 5A-FIG. 5B. Alternatively, due to the novel mechanical construction as described in FIG. 1-FIG. 3, delivery drones 100 and 200 can enter the balcony without causing propeller harms or damage to the customer. In the situation where the delivery is programmed to single-storied residential house 1730, first delivery drone 200-1 can fly at the safe altitude H on first virtual street 1711. Upon arrival at single-storied residential house 1730, second delivery drone 200-3 can vertically land on GPS-based street 1701 by lowering itself in a direction 212D. Alternatively, second delivery drone 200-1 moves passing a left boundary 1701L to the front yard to complete the delivery.

Figure 18:
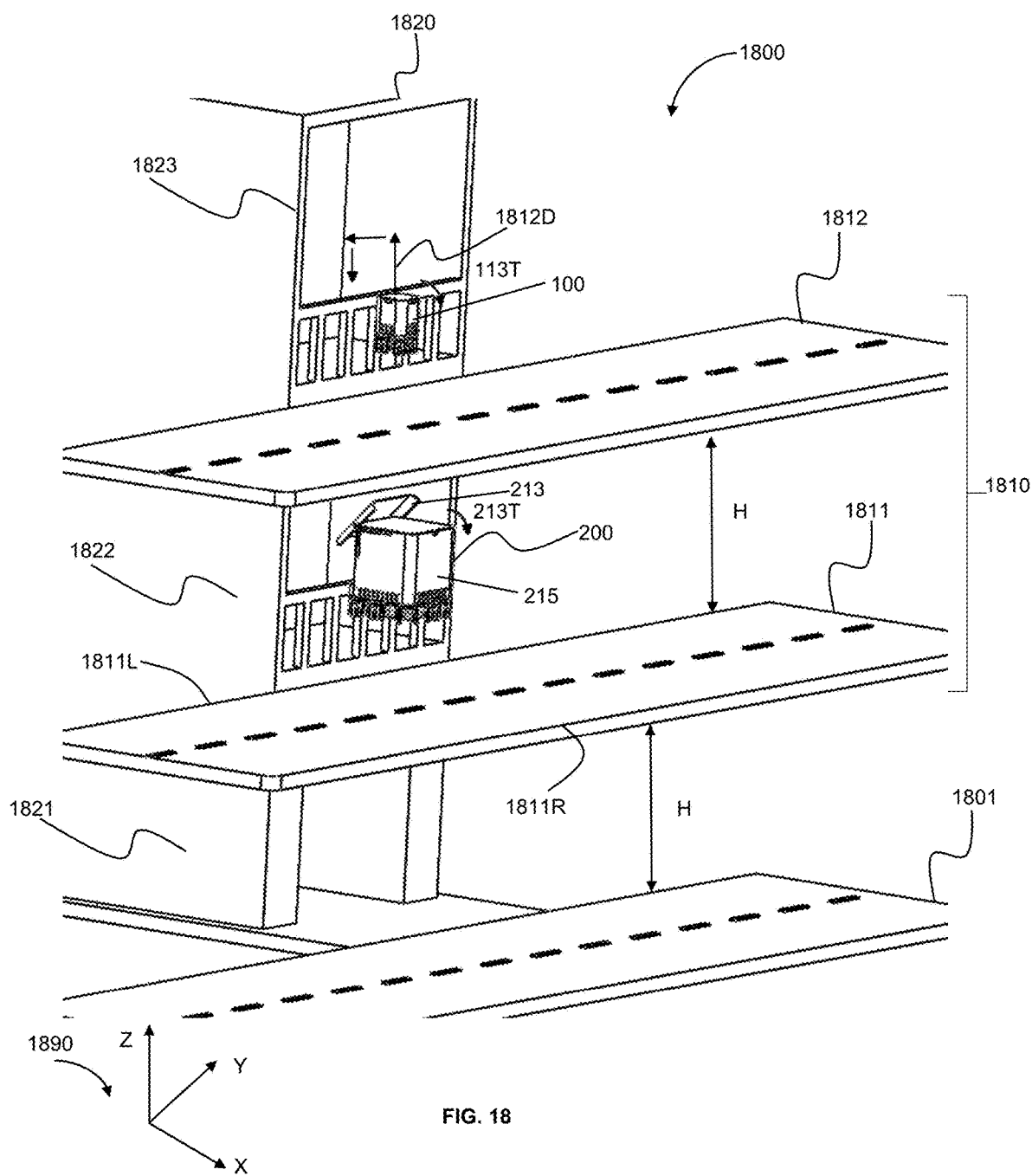
FIG. 18 is a three-dimension (3D) perspective view of a high-rise condominium where a delivery drone can conveniently deliver the packages inside the balcony of a customer in accordance with an exemplary embodiment of the present invention.

Next referring to FIG. 18, a close-up three-dimension (3D) perspective view of the condominium destination where multiple delivery drones delivering to different stories is illustrated. First, it will noted again that all entities within FIG. 18 including GPS-based street 1801, virtual streets 1811-1812, and a condominium 1820 share the same X-Y-Z Cartesian coordinate 1890. When arriving to particular high-rise condominium 1820, at particular floor, and at particular room of that floor, first delivery drone 100 is programmed to move cross to a left boundary 1812L of second virtual street 1802 and hover. Finally, first delivery drone 100 make a turn to lateral side 113 in direction 113T parallel to the balcony. While delivery drone 100 is hovering, customer can lift up top side 113 in manual open mechanism in direction 501 described in FIG. 5A and pick up the package. It is noted that, if delivery drone 100 is equipped with automatic open mechanism as described in FIG. 5B, lateral side 113 is automatically opened in directions 511 and 512 to expose the packages to the customer. In some embodiments of the present invention, delivery drone 100 can be programmed to enter the balcony of the customer. At the same time, second delivery drone 200 arrives to the destination on second floor 1822. Second delivery drone 200 is programmed to move closer to the left boundary 1822L of second virtual street 1811 and hover. While hovering, second delivery drone 200 make a turn to lateral side 213 in direction 213T parallel to the balcony. Finally, lateral side 213 slides up to open in the mechanism described in FIG. 5B so that the customer can pick up the package.

In summary, FIG. 11-FIG. 18 show that the virtualized infrastructure of the present invention includes a GPS street map and a three-dimension scan map that form multi-leveled virtual streets, having point X-Y-Z Cartesian coordinates, operable to guide delivery drones 100, 200, and 400 to fly from a first address to a second address on an optimal flight route. This 3D virtual infrastructure achieves the following objects of the present invention:

(a) reduce the traffic jam as compared to the traditional delivery trucks;

(b) provide a specific delivery route so as to improve efficiencies and safety; and (c) avoid unwanted accidents caused by collision between delivery drones 100, 200 and objects and people along the unguided delivery routes.

Now referring to FIG. 19, a schematic diagram of an electronic delivery system 1900 in accordance with an exemplary embodiment of the present invention is illustrated. Electronic delivery system 1900 is a macroscopic system dedicated to operate, manage, and chart optimal flight routes for the entire fleet of delivery drones. As such, electronic delivery system 1900 includes a delivery drone electronic system 1940 connected to a first network 1950, a communication & data center 1951, a second network 1960, a communication device A 1961, and a communication device B 1962. First network 1950, communication & data center 1951, second network 1960, communication device A 1961, and communication device B 1962 are located offsite of delivery drones 100, 200, and 400. It is understood that communication & data center 1951 is a command and control center used by the delivery drone operators to observe, communicate, study, and manage the operations of the entire fleet of delivery drones. In some aspects of the present invention, communication & data center 1951 stores each flight data into data center 1951, performs analytics of the terrain of each flight, uses machine learning or artificial intelligence to find smarter, better, and safer optimal flight routes for future deliveries. Communication device A 1961 can be either a laptop, desktop, a cell phone, a mobile device used by a buyer of a merchandise. Communication device B 1962 can be either a laptop, a cell phone, a desktop computer used by a seller of a merchandise to communicate with communication and data center and communication device A 1961. It will be described later in FIG. 20 and FIG. 21, communication device A 1961 and communication device B 1962 can visually observe the flight of each delivery drone as it flies automatically by itself from beginning to end, and from take-off to delivery.

Drone electronic system 1940 is a microscopic system located on site of delivery drones 100, 200, and 400. Delivery drone electronic system 1940 includes an electronic speed control (ESC) 1901, electric ducted fans (EDF) 1902, servo motors for tilt and rotation 1903, a solar panel 1904, smart battery system (SBS) for EDF 1905, a smart battery system (SBS) for control circuit 1906, and a control circuit 1920. Control circuit 1920 is located in electronic sections 120, 220, and 420 described above.

Electronic Speed Control (ESC) unit 1901 is an integrated circuit designed to controls and regulate the speed V of thrust motors 131-142, 231-264, and 471-474 using a high frequency, high resolution 3-phase DC power, and pulse width modulation (Dshot) protocols. In various embodiments of the present invention, Electric ducted fans (EDF) 1902 are used as thrust motors 131-142, 231-264, and 471-474. Electric ducted fans 1902 is a quiet type (qEDF) having a duct diameter of 70 mm, including 12 blades at 2300 kV, 75 Amperes, and 1,725 W of thrust per EDF. In other embodiments of the present invention, fuel jet engines can be used as thrust motors 131-142, 231-264, and 471-474. Servo motors for tilt and rotation controllers ("servo motors") 1903 are secured to rotation connectors 601, 630, first and second tilt connectors 617, 618, 651, or 652 of delivery drone 100, 200, and 400 respectively. Each of servo motors 1903 is a feedback electronic circuit that controls the precise position of delivery drone by constantly sensing and adjusting the current phase (Θ, φ) of each frame bracket in thrust motors 130, 230, and 430. The correct X-Y-Z Cartesian coordinate including GPS location and altitude H of each delivery drone are stored in a memory as GPS coordinates or virtualized infrastructure X-Y-Z Cartesian coordinates. CPU 1928 compares the available coordinates of fly route to the real-time position of a delivery drone. The errors are recognized and feedback to servo motors 1903 to adjust the direction as well as the speed V so that each delivery drone can stay within the boundaries of each virtual street such as 1110-1810, 1111L, 1111R, 1111W, 1211L, 1211R, 1211W, 1711L, and 1711R.

Continuing with FIG. 19, smart batteries system (SBS) for electronic components 1906 are electrically coupled to solar panels 1904, the same as solar panels 219, which are laid on top side 211, lateral sides 213-216 of delivery drone 200 in FIG. 2. Smart batteries system 1906 and smart battery system for EDF 1905 (hereinafter "SBS 1906 and 1905") allow operating systems (OS) stored inside control circuit 1920 to perform power management operations via a smart battery charger based on remaining estimated run times by determining accurate state of charge readings. Through this communication, control circuit 1920 also controls the battery charge rate. Communication is carried over electrical connections 1931. In various embodiments of the present invention, SBS 1906 and SBS 1905 include a special integrated circuit electrically coupled to manage a battery pack and solar panel 1904. SBS 1906 and SBS 1905 monitor the battery pack and reports information to control circuit 1920. This information might include battery type, model number, manufacturer, characteristics, charge/discharge rate, predicted remaining capacity, an almost-discharged alarm so that delivery drones 100, 200, and 400 can receive safe fast-charging by solar panel 1904.

Control circuit 1920 includes an electronic gyroscope and sensors 1921, a GPS altitude sensor 1922 for sensing the altitude H of each delivery drone as presented in FIG. 11-FIG. 18, a collision avoidance sensors 1923, an imaging device 1924, a memory 1925 which stores a 3D virtualized infrastructure 1925M and various software applications 1925P that control the operations of the delivery drones, a LCD and microphone 1926, an input/output (I/O) port 1927, a central processor unit 1928, safety system ignition controllers that includes top airbag and bottom airbag ignition controllers 1929-1 and a middle airbag ignition controller 1929-2. All of these electrical components are located on site of each delivery drone, especially on the bottom side 112, 212, and 412 and indicated as electronic sections 120, 220, and 420 respectively. These components are electrically coupled together by electrical connections 1931. In various embodiments of the present invention, a mobile internet module SIM card 1930 is configured to enable communication between delivery drones 100, 200, and 400 with communication and data center 1951, communication device A 1961, communication device B 1962 via a first network 1950, second network 1960 and wireless communication channels 1932.

Continuing again with FIG. 19, electronic gyroscope and sensors 1921 include accelerator sensor, magnetic sensor, and temperature sensors which placed on site of the delivery drones to detect vibration, angular velocity, speed, and the temperatures inside each delivery drone. Electronic gyroscope uses either crystal, ceramic, or silicon transducers to detect vibration of the delivery drone by sensing the angular velocity of a vibrating object of the delivery drone (e.g., lateral sides 213-216 or bottom side 212). Then the electronic gyroscope sends back an electrical signal that is proportional to the vibration. The electronic gyroscope can be used to sense the angle moved such as the angle moved of edge 217, lateral sides 213-216, or bottom side 212. Referring back to FIG. 16, when delivery drone 200 arrives at the balcony of condominium 1620, it is programmed to rotated in direction 213T, facing lateral side 213 toward the customer and moves closer to the balcony. There, lateral side 213 slides up to top side 211 in direction 511 and 512 so that the customer can retrieve the ordered package. In other situations, electronic gyroscope can balance delivery drones 100, 200, and 400 in FIG. 11-FIG. 18 to maintain their balances in bad weather or in a sudden gust of wind. Referring back to FIG. 17, the electronic gyroscope and CPU 1928 can work together to precisely move delivery drones 200-1 and 200-2 in their respective virtual streets 1711 and 1712. At the destination of single-storied residential house 1730, delivery drone 200-1 vertically lands in direction 212D. As it lands, delivery drone 200-1 turns in direction 213T so that lateral side 213 will face the façade of single-storied residential house 1730. All of this are made possible by the electronic gyroscope and sensors 1921 and CPU 1928.

Continuing with FIG. 19, accelerator sensor measures magnitude of vector V of delivery drones 100, 200, and 400. Referring back to FIG. 13, delivery drone 200-1 is flying at the speed $V_3$ back to communication and data center 1951. Accelerator sensor detects the speed and electronic gyroscope detects the direction of delivery drone 200-1. Together, electronic gyroscope and accelerator can measure the velocity of delivery drone 200-1, which includes the magnitude and direction, $V_3$. On virtual street 1312, because of accelerator sensor, delivery drone 200-2 and delivery drone 200-3 can fly at a constant velocity $V_2$ and maintain a safe distance d from each other. On third virtual street 1313, with the aids of electronic gyroscope and sensors 1921, delivery drone 200-4, 200-5, and 200-6 can fly edge 217 first at constant velocity $V_1$ and maintain a constant distance d. In many embodiments of the present invention, electronic gyroscope and sensors 1921 can be implemented using microelectromechanical systems (MEMS) technology.

Next, GPS altitude sensor 1922 is programmed to work closely with the algorithms coded in drone operation program instructions 1925P and CPU 1928 to determine the altitude H where delivery drone should operate. In FIG. 11, delivery drone 200 is moving edge 217 first in direction 1117D at altitude H that is constantly sensed by altitude sensor 1922. However, in FIG. 13, delivery drone 200-1 is operated at altitude H, delivery drones 200-1 and 200-2 operating at altitude 2H, and delivery drone 200-4 to 200-5 operated at altitude 3H, all possible by GPS altitude sensor 1922. In FIG. 14, delivery drone 200 is moving edge 217 first along the directions 1422D1 to the altitude 2H and then 1422D2 to altitude 3H along virtual street 1419 to avoid collision with obstacle 1430.

Collision avoidance sensor 1923 uses either Lidar (light detection and ranging), radar, ultrasonic sensing technology, or camera technologies to detect moving objects that stray into virtual street of delivery drones 100, 200. Referring again to FIG. 14, obstacle 1430 may suddenly stray into virtual streets 1411 and 1411 threatening the safety of delivery drone 200. Collision avoidance sensor 1923 detects and informs CPU 1928 about object 1430. CPU 1928 changes tilt angle Θ of thrust motors 231-264 to move delivery drone 200 along vertical virtual street 1422D1, 1422D2, and 1422D3 to avoid collision. Upon reaching virtual street 1419, when collision is averted, CPU 1928 changes tilt angle back to move forward with edge 217 first along direction 1419D. In different embodiments of the present invention, Doppler radar or stereo cameras can be used to detect time to collide (TTC) in collision avoidance sensor 1923.

Imaging device 1924 is equipped on delivery drone 100, 200, and 400 to scan real-time images of GPS-based streets 1101-1801. Imaging devices 1924 can be 3D laser scanner, infrared, and camera for capturing real-time imaging data and sending back to communication & data center 1951 for later analysis of the terrains and the analytics of customer behaviors. As such, future optimal flight routes 1111-1812 can be safer, smarter, and more efficient.

Continuing with FIG. 19, memory 1925 is configured to store a 3D virtualized infrastructure 1925M and a drone operation program 1925P. The detailed description of 3D virtualized infrastructure 1925M will be discussed in FIG. 20. The detailed description of drone operation program 1925P will be discussed in FIG. 21. As shown in FIG. 11-FIG. 18, 3D virtualized infrastructure 1925M is a geo-referenced map that includes GPS-based streets 1101-1801 and 3D scan of geographical cell 1250 where delivery drones 100, 200, and 400 are programmed to operate. The 3D model (e.g. 1192 and 1101 in FIG. 11) and GPS-based streets 1101-1801, all are tied to the same X-Y-Z point Cartesian coordinates, are embedded or stitched together. Within the meaning of the present invention, point X-Y-Z Cartesian coordinates are "pixels" that make up the GPS maps, virtual streets, obstacles, and 3D model. Thus, every point or "pixel" that made up the entire virtualized infrastructure 1925M has X-Y-Z Cartesian coordinates. Then virtual streets 1111-1812 are point-to-point copied from GPS-based streets 1101-1801 and raised to different altitudes H. This way, virtual streets 1110-1810 all and have X-Y-Z point Cartesian coordinates and are least at a safe altitude H above GPS-based streets 1101-1801. As such, boundaries such as 1211L, 1211R, 1711L, 1711R, 1811L, and 1811R can be determined by of point X-Y-Z Cartesian coordinates (such as 1193 at $(x_3, y_3, z_3)$, FIG. 11) and have common X-Y-Z Cartesian coordinates 1290. Delivery drones 100, 200 are programmed to fly within the left and right boundaries of virtual streets 1110-1810 unless they are programmed to enter the balcony to deliver a package to a customer according to 1812D direction. Please refer back to FIG. 18.

Drone operation program 1925P is a software program that includes instructions to operate delivery drones 100, 200, and 400 from beginning to end. First, when a fleet of delivery drones such as delivery drones 100 and 200 are commissioned to operate in geographical cell such as 1250, the entire virtualized infrastructure 1925M is loaded into memory 1925 via I/O port 1927 or mobile internet module/SIM card 1930 of each delivery drone. As soon as a delivery begins, a destination address and an optimal flight route are loaded into a delivery drone. CPU 1928 uses this optimal flight route to automatically fly these delivery drones to the destination address without using operators or pilots who fly these delivery drones remotely with a remote control. This optimal flight route may include a special flight trajectory such as 1812D when delivery drone 100 moves closer to the front of a balcony, passing left boundary 1812L, over the balcony rail, and lands inside the ground area of a balcony. Please see FIG. 18 again. In some embodiments, drone operation program 1925P also includes an instruction to automatically open lateral side 213 as shown in FIG. 2 and directions 511 and 512 in FIG. 5B so that the customer can receive the packages. Please note that all other operations of delivery drones 100, 200 described in FIG. 1-FIG. 18 are coded in drone operation program 1925P.

LCD and microphone 1926 are placed either on lateral sides 113-116 or inside container 200C as shown in FIG. 2 so that customer can communicate to a drone operator regarding the package via the face-time program or the like. When delivery drone 200 is programmed to have a face-time communication with a customer upon arrival, as soon as lateral side 213 opens, LCD and microphone 1926 (or communication device 127, 227, 427) is popped up by means of stand 227L. In some embodiments, the customer may press a button on LCD and microphone 1926 to start speaking with an operator. In some other embodiments of the present invention, communication device 1927 also displays the states and conditions of delivery drones 100, 200, and 400 such as smart delivery status, optimal flight route number, X-Y-Z Cartesian coordinates, batteries (SBS) 1905 and 1906 levels; maintenance cycle; temperatures of each component inside drone electronic system 1940 and containers 110, 210, and 410; network communication signal levels; connectivity; calibration; airbags system 800 conditions and readiness, etc.

The following are the functions of central processing unit 1928 which is an integrated circuit microprocessor:
(1) Receive a flight trajectory as well as 3D virtualized infrastructure 1925M and drone operation program 1925P;
(2) Control thrust motors 131-142, 231-264, 471-474 and servo motors 1903 so that delivery drones 100, 200, and 400 can fly by themselves without any remote controls of an operators in accordance with the optimal flight route;
(3) Communicate with sensors 1920, 1922, 1923 to avoid collision and maintain the fly course without weaving from side to side;
(4) Maintain optimal conditions using temperature sensor 1921 and smart battery systems 1905 and 1906. CPU 1928 orders SBS 1905 and 1906 to recharge so that thrust motors 131-142, 231-264, 471-474 and drone electronic system 1940 can last longer. Especially when CPU 1928 orders the charging of voltage supplies into batteries from solar panel 1904 which is the same as solar panel 219 in FIG. 2. When the temperature inside container 110, 210, or 410 is over a preset temperature that adversely affect the package, CPU 1928 sends a warning signal back to the operator via I/O port 1927 or mobile internet module/SIM card 1930, and display devices in communication & data center 1951, communication device A 1961, and communication device B 1962;
(5) Perform the delivery by passing left boundaries or right boundaries to move closer to the balcony, slide open lateral side 213, start face-time communication via LCD/microphone 1926; and
(6) Fly back to base repeating step (1)-(3) above. In case of power failure and any of thrust motors 131-142, 231-264, and 471-474 fails, CPU 1928 commands top and bottom airbag ignition controller 1929-1 and middle airbag ignition controller 1929-2 to expand, protecting delivery drones 100, 200, and 400. In some embodiments of the present invention, if delivery drone 100 fails at an altitude too high to use airbag system 800 as described in FIG. 8 and FIG. 9A-FIG. 9B, CPU 1928 can use parachute system 1000. In some other embodiments of the present invention, upon landing safely on the ground somewhere off course, delivery drone 100 sends a distress signal and current location via I/O port 1927 or mobile internet module/SIM card 1930 so that the owner can retrieve delivery drone 100 and/or the package.

Wireless communication channel 1932 can be different physical connections such as wireless channels such as Bluetooth, 3G, 4G, LTE, 5G, Wi-Fi, radio frequency (RF), Near Field Communication (NFC), Ethernet, LoRaWAN, or any combinations thereof.

Communication and data center 1951 are usually operated by system operators of delivery drones 100, 200, and 400. Data center 1951 includes non-transitory computer readable medium that includes optical memory such as CD, DVD, HD-DVD, Blue-Ray Discs, etc.; semiconductor memory such as RAM, EPROM, EEPROM, etc.; and/or magnetic memory such as hard-disk drive, floppy-disk drive, tape drive, MRAM, etc. Drone operation program 1925P also includes instructions that display a graphic user interface (GUI) on the display screens of communication device A 1961 and/or communication device B 1962. When the GUI is activated by an operator or customer, the entire optimal flight routes of delivery drone 100, 200, or 400 as described above can be viewed in real-time.

Now referring to FIG. 2000, a flowchart 2000 for a constructing a 3D virtualized infrastructure for the delivery drones in accordance with an exemplary embodiment of the present invention is illustrated.

At step 2001, GPS street map and a 3D scan model of the area are collected. In various embodiments of the present invention, step 2001 can be implemented by obtaining GPS based streets with GPS coordinates such as latitude, longitude, and altitude. The 3D scan model has point X-Y-Z Cartesian coordinates. GPS coordinates can be converted to X-Y-Z Cartesian coordinates. Reference points on both maps can be tied together so that both maps can have a common X-Y-Z Cartesian coordinate system (such as 1190-1890 in FIG. 11-FIG. 18). This is called geo-referencing. In some embodiments of the present invention, Google map or Microsoft Bing map can be used. 3D scan model can be obtained from 3D laser scanners such as Leica, FARO, Artec Ray, Creatform, Minolta, etc. The 3D scan model can also be generated from Google street images or other images. In some other embodiments of the present invention, 3D scan model can be rendered from GPS coordinates using ECEF (Earth Centered and Earth Fixed) or other similar software programs.

At step 2002, the 3D scan map and GPS map are stitched together using their point X-Y-Z Cartesian coordinates. GPS maps have 3D coordinates including latitude, longitude, and altitude which are either X-Y-Z Cartesian coordinates or spherical coordinate. 3D scan model also uses X-Y-Z Cartesian coordinates. Step 2002 can be implemented by geo-referenced a known point or feature from both maps and stitched them together to generate a 3D map of the area or geographical cell 1250 with GPS coordinates or a common X-Y-Z Cartesian coordinate system such as 1190-1890. The results from step 2002, the exact altitude and location of every household at any building structure are known. The altitude and coordinate location of customers who live in high-rise condominiums 1620, 1720, and 1820 are known with pinpoint accuracy. Those who live in single-storied residential house 1730 at a sea level or on a hill in high-rise condominium 1720 or 1820 are also known.

At step 2003, GPS streets are copied, regenerated, and stacked into layers at a predetermined safe altitude H to form a virtualized infrastructure of the area. The predetermined safe altitude H is preselected depending on the topography of area revealed by 3D scan model. The predetermined safe altitude H in a downtown of a cosmopolitan city such as Ho Chi Minh City and New York are different from those in a hillside residential are such as Da Lat or Oakland Hill, Calif. GPS streets are digitally copied with X-Y-Z Cartesian coordinates. The copied streets are regenerated and stacked from the predetermined safe altitude H. After the virtualized infrastructure map of step 2001 has been built, a delivery address is received that includes a GPS address and an altitude H. The delivery address includes a GPS address and an altitude H. In some embodiments, the delivery address also includes a safety altitude and a safe distance d between a cascades of delivery drones 200-2 to 200-6. Step 2002 can be implemented using delivery drones 100, 200, and 400 with electronic delivery system 1900.

Process 2000 of the present invention achieves the following objectives:

(1) A safe and efficient trajectory for not only the delivery drones of the present invention but other commercial drones to fly;

(2) Customers, owners, and sellers can see the delivery in real-time and know the exact location of the delivery drones of the present invention;

(3) Unwanted collisions and damages to properties and harms to people can be substantially avoided by following the virtualized infrastructure obtained from process 2000.

Now referring to FIG. 21, a method 2100 of controlling a delivery drone to deliver packages to customers living in different locations and altitudes in accordance with an exemplary embodiment of the present invention is shown. Method 2100 can be implemented using hardware and software components of electronic delivery system 1900. Hardware component and software components of method 2100 include delivery drones 100, 200, and 400 as described in FIG. 1 to FIG. 10, electronic gyroscope and sensors 1921, GPS altitude sensors 1922, collision avoid sensors 1923, imaging device 1924, memory 1925 that stores the instructions of method 2100 in drone operation program 1925P, 3D virtualized infrastructure 1925M, LCD/microphone 1926, I/O port 1927, CPU 1928 that executes the instructions of method 2100, top and bottom airbags ignition controller 1929-1, middle airbags ignition controller 1929-2, electronic speed control (ESC) 1901, SBS for EDF 1905, electronic ducted fans 1902, servo motors 1903, solar panel 1904, first internet network 1950, communication and data center 1951, second internet network 1960, communication device A 1961, and communication device B 1962.

At step 2101, a delivery address of a customer who purchases a package either online or via a telephone is received. The delivery address includes a latitude, a longitude, and an altitude which is converted to the X-Y-Z Cartesian coordinates. In some embodiments, the delivery address also includes an altitude H and a safety distance between a series of delivery drones. Step 2101 can be implemented using delivery drones 100, 200, and 400 and electronic delivery system 1900. The delivery address may be loaded to each delivery drone via I/O port 1927 by USB or wirelessly via mobile internet module/SIM card 1930 and/or wireless communication channel 1932. In some embodiments of the present invention, a graphic user interface (GUI) application or a website on communication device A 1961, communication device B 1962, or communication and data center 1951 can load the delivery address.

At step 2102, after such information are received by a delivery drone, an optimal flight route in the virtualized infrastructure is calculated. The optimal flight route is calculated based on GPS based streets 1101-1801 and predetermined safe altitude H. In some situations, referring back to FIG. 13, the optimal flight route takes into considerations of the altitude H of other delivery drones 200-1, 200-3, 200-4, 200-5, 200-6. If virtual street 1313 are too crowded, virtual street 1312 can be designated as optimal flight route for delivery drones 200-2 and 200-3, especially when delivery drone 200-1 is flying back in the opposite direction. In some other exemplary situations, referring back to FIG. 14, the optimal flight route can be 1422D1, 1422D2, 1422D3, and 14190 when obstacle 1430 such as a building crane is temporarily intruding into virtual streets 1415 and 1417. Similarly, in some situations, the optimal flight route is 1514D1, 1514D2, 1514D3 and 1519D when the physical freeway interchange 1503 may not be high enough for a safe fly. Yet in some other exemplary situations, referring back to FIG. 16-FIG. 18, the optimal flight route must take into consideration where the customer lives in high-rise condominium 1620. In FIG. 16, the customer lives on the second floor, the optimal flight route is virtual street 1612 at the altitude of 2H. In FIG. 17, delivery drone 200-1 knows that the delivery address is on the ground of single-storied residential house 1730, delivery drone 200-1 has to select the optimal flight route on virtual street 1711 at the altitude H. Whereas, delivery drone 200-1 chooses the optimal flight route on virtual street 1712 at altitude 2H.

At step 2103, delivery drone is lifted off and moved edge first along the optimal flight route of step 2102. Step 2103 is implemented using thrust motors 131-142, 231-264, and 471-474 as electric ducted fans 1902, electronic speed control (ESC) 1901, servo motors 1903, CPU 1928, and 3D virtualized infrastructure 1925M stored inside memory 1925. More particularly, delivery drone 100 starts to take off by CPU 1928 commanding ESC 1901 to line up the angles Θ and φ at zero degree. At which, the maximum thrust of thrust motors 131-142 aiming toward the center of the Earth in direction 211U. Delivery drone 100 is vertically lifted off in direction 211U. Then, the rotation angles Θ is changed to 45° and the tilt angle φ is changed to more than 0 degree, depending on how fast the velocity V is. Rotation angle Θ and tilt angle φ are set by ESC 1901 which is set by CPU 1928. This way, delivery drone 100 is moved edge 117 first along optimal flight route as described in FIG. 11-FIG. 18. With this implementation of step 2102 in this particular situation, a customer may stands on his/her balcony to receive a package from delivery drone 200. Before arrival at the correct delivery address (third condominium from the left), delivery drone 200 is moving edge 217 first. As soon as delivery drone 200 arrives, it turns lateral side 213 in direction 213T to face lateral side 213 to the balcony.

Continuing with step 2103, during the course of the optimal flight route, delivery drones 100 and 200 constantly use collision avoidance sensors 1923 to detect unexpected obstacles that move in the optimal flight route. Unexpected obstacles could be a flock of birds, construction cranes in a downtown area, other drones, fly cams, even small aircrafts. In such situation, collision avoidance sensors 1923 send a signal to inform CPU 1928 about the danger. CPU 1928 commands ESC 1901 and servo motors 1903 to change the direction of delivery drones 100, 200, averting the unexpected dangers. In some other situation, when a total failure occurs that thrust motors 131-142 completely malfunction, CPU 1928 activates middle airbags 1929-1 and top and bottom airbags 1929-2 to protect delivery drone 100. In some other situations, referring back to FIG. 10, when the optimal flight route is too high and airbag safety system 800 cannot protect the safety of delivery drone 100, CPU 1928 commands parachute system 1000 to activate. As delivery drone 100 lands on the ground, it sends a distress SOS signal so that communication & data center 1951 as well as customer with communication device A 1961 and seller with communication device B 1962 know the exact geo-location of distressed delivery drone 100.

At step 2104, virtual street boundaries are constantly sensed in real-time so that the delivery drone can be maintained within the allowed width. Step 2104 can be implemented by using GPS 1922, Mobile internet module 1930, electronic gyroscope and accelerator sensor 1921. Then the real-time X-Y-Z Cartesian coordinates of delivery drones 100, 200, and 400 are compared to the available X-Y-Z Cartesian coordinates of fly route. Boundaries such as 1111L, 1111R, 1211L, 1211R, 1711L, 1711R, 1812L, and 1812R are sensed. If the drone's real-time coordinate is out of the available coordinates, CPU 1928 commands ESC 1901 and servo motors 1903 to change the direction of delivery drones 100, 200, 400 back to the available coordinates. In some situations, step 2104 can be further implemented to allow delivery drone 100 to cross left boundary 1812L to approach the balcony of condominium 1820. Yet in some situations, delivery drone 100 is programmed to move in direction 1812D to deliver the package right inside the balcony. In many aspects of the present invention, foreign obstacles can be detected using collision avoidance sensors 1923 as described in step 2103 above to avert fatal collisions. In some situations, delivery drone 200 is allowed to cross left boundary 1811L and lowering itself in direction 1812D to deliver the package right in the front yard of residence house 1730.

At step 2105, upon arrival at the destination, the delivery drone is commanded to either hover at the balcony or the front yard of the customer's house. In some aspects of the present invention, step 2105 also includes the face-time communication with the center regarding the delivery of the package. Step 2105 can be implemented Step 2105 is implemented using thrust motors 131-142, 231-264, and 471-474 as electric ducted fans 1902, electronic speed control (ESC) 1901, servo motors 1903, CPU 1928, and 3D virtualized infrastructure 1925M stored inside memory 1925.

More particularly, referring back to FIG. 17 and FIG. 18, upon arrival at the destination, the delivery drones 200-1 and 200-2 are commanded to either hover at the balcony of condominium 1720 or the front yard of residential house 1730. At the situation in FIG. 17, delivery drone 200-1 is allowed to surpass left boundary 1711L and lower itself in direction 1812D to land right on the front yard of residential house 1730. As it is lowering in direction 1812D, delivery drone 200-1 turns on itself so that lateral side is facing the incoming customer. It is noted that by the virtue of communication device A 1961 and drone operation program 1925P loaded thereto, the customer knows exact the arrival time of delivery drone 200-1. He or she can watch delivery drone 200-1 making the vertical landing in direction 1812D on her/his front or back yard. As he or she stand right in front of delivery drone 200-1, a face-time communication with data center 1951 takes place by means of LCD/microphone 1926 (communication device 227 in FIG. 5B). In another situation, delivery drone 200-2 arrives at condominium 1720, as alluded above, the customer can watch on his/her communication device A 1961 as delivery drone 200-2 is hovering near his/her balcony. Yet in some situations, delivery drone 100 is programmed to make a delivery right inside the balcony of the customer. The instructions from drone operation program 1925P tells CPU 1928 to command thrust motors 131-142 to fly in direction 1812D.

It is noted that all the examples describing different scenarios of flying and delivering of delivery drones 100, 200 are non-limiting, other unexpected situations that could threaten the safety of delivery drones 100, 200 shall be learned by artificial intelligence and machine learning from videos, pictures of the optimal flight route communicated back to data center 1951 via internet network 1950 and wireless communication channel 1932. Data center 1951 perform analytics of the drone deliveries in order to pre-program the delivery drones to avoid fatal accidents. All situations not described within the present disclosure are within the scope of the present invention.

The computer program instructions such as 2000 and 2100 may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

DESCRIPTION OF NUMERALS 100 2×2 delivery drone
100-1 delivery drone on the first level virtual street
100-2 first delivery drone in a series of delivery drones
100-3 second delivery drone in a series of delivery drones
100-4 first delivery drone in a series of delivery drones
100-5 second delivery drone in a series of delivery drones
100-6 third delivery drone in a series of delivery drones
110 cubic container
111 top side
111U vertical take-off direction
112 bottom side
112D vertical landing direction
113 first lateral sides
114 second lateral side
115 third lateral side
116 fourth lateral side
117 vertices (edges) of delivery drone
120 electronic section
121 side ventilation openings
127 LCD and speakers for face-time communication
130 array of thrust motors
131 thrust motor of the 2×2 array of thrust motors
132 thrust motor of the 2×2 array of thrust motors
141 thrust motor of the 2×2 array of thrust motors
142 thrust motor of the 2×2 array of thrust motors
158 tilt connector
181 frame bracket for thrust motors
200 4×4 delivery drone (delivery drone having 4×4 thrust motors)
200-1 first 4×4 delivery drone
200-2 second 4×4 delivery drone 200-3 third 4×4 delivery drone
210 container
211 top side
211U vertical take-off direction of delivery drone
212 bottom side
212D vertical lowering direction of drone
213 first lateral side
213T turning around a lateral side toward customer of drone
214 second lateral side
214O first 90 degree slide track
216S first 90 degree slide connector
215 third lateral side
216 fourth lateral side
216O second 90 degree slide track
216S second 90 degree slide connector
217 vertices (edges)
219 solar panels
220 electronic section
221 side ventilation openings
222 bottom ventilation openings
227 LCD and microphone for face-time communication
227D direction of LCD erectable stand
227L LCD erectable stands
227R LCD erectable stands
231 thrust motor of the 4×4 array of thrust motors
232 thrust motor of the 4×4 array of thrust motors
233 thrust motor of the 4×4 array of thrust motors
234 thrust motor of the 4×4 array of thrust motors
241 thrust motor of the 4×4 array of thrust motors
242 thrust motor of the 4×4 array of thrust motors
243 thrust motor of the 4×4 array of thrust motors
244 thrust motor of the 4×4 array of thrust motors
251 thrust motor of the 4×4 array of thrust motors
252 thrust motor of the 4×4 array of thrust motors
253 thrust motor of the 4×4 array of thrust motors
254 thrust motor of the 4×4 array of thrust motors
261 thrust motor of the 4×4 array of thrust motors
262 thrust motor of the 4×4 array of thrust motors
263 thrust motor of the 4×4 array of thrust motors
264 thrust motor of the 4×4 array of thrust motors
281 frame bracket for thrust motors
400 N×M heavy duty delivery drone where N≠M
410 container box
411 top side
412 bottom side
413 first lateral side
414 second lateral side
415 third lateral side
416 fourth lateral side
417 vertices (edges) of delivery drone
420 electronic section
427 LCD communication panel and speakers
431 thrust motor of the array of 20 thrust motors
432 thrust motor of the array of 20 thrust motors
433 thrust motor of the array of 20 thrust motors
434 thrust motor of the array of 20 thrust motors
441 thrust motor of the array of 20 thrust motors
442 thrust motor of the array of 20 thrust motors
443 thrust motor of the array of 20 thrust motors
444 thrust motor of the array of 20 thrust motors
451 thrust motor of the array of 20 thrust motors
452 thrust motor of the array of 20 thrust motors
453 thrust motor of the array of 20 thrust motors
454 thrust motor of the array of 20 thrust motors
461 thrust motor of the array of 20 thrust motors
462 thrust motor of the array of 20 thrust motors rs
463 thrust motor of the array of 20 thrust motors
464 thrust motor of the array of 20 thrust motors
471 thrust motor of the array of 20 thrust motors
472 thrust motor of the array of 20 thrust motors
473 thrust motor of the array of 20 thrust motors
474 thrust motor of the array of 20 thrust motors
481 frame bracket
501 manual opening of drone box
511 automatic opening of drone box
512 automatic opening of drone box
601 rotation connector
611 top side of inverted U shape frame bracket
613 first lateral side of inverted U shape frame bracket
614 first lateral side of inverted U shape frame bracket
615 first opening
616 second opening
617 first tilt connector
618 second tilt connector
619 third opening
620 fourth opening
621 first landing foot
622 second landing foot
630 rotation connector
631 male connector
632 base
642 cylindrical frame bracket
643 front cutaway
644 back cutaway
651 first tilt connector
652 second tilt connector
661 first landing foot
662 second landing foot
701 rotational direction of thrust motor
800 airbag system
810 top portion of airbag
811 first petal shape top airbag
812 second petal shape top airbag
813 third petal shape top airbag
814 fourth petal shape top airbag
820 middle airbag portion
821 first square shape middle airbag
822 first square shape middle airbag
823 first square shape middle airbag
824 fourth square shape middle airbag
825 center hole
826 perimeter holes
830 bottom airbag portion
831 first petal shape bottom airbag
832 second petal shape bottom airbag
833 third petal shape bottom airbag
834 fourth petal shape bottom airbag
1000 parachute safety system
1001 first parachute for first edge
1002 second parachute
1003 third parachute
1004 fourth parachute
1101 GPS-based street
1101L left boundary of GPS-based street
1101R right boundary of GPS-based street
1101W width of GPS-based street
1111 virtual street
1111L left boundary of virtual street
1111R right boundary of virtual street
1111W width of virtual street
1117D edge first direction of delivery drone on the virtual street
1190 X-Y-Z Cartesian coordinate system 1191 point GPS coordinate location
1192 point X-Y-Z Cartesian coordinate of a feature in 3D model
1193 point X-Y-Z Cartesian coordinate of a virtual street
1194 X-Y-Z Cartesian coordinate of a delivery drone
1201 first section of GPS-based street
1201L left boundary of first section of GPS-based street
1201R right boundary of first section of GPS-based street
1201W width of first section of GPS-based street
1202 curved section of GPS-based street
1202L left boundary of the curved section
1202R right boundary of the curved section
1202W width of the curved section
1203 second section of GPS-based street
1203L left boundary of the second section of GPS-based street
1203R right boundary of the second section of GPS-based street
1203W width of the second section of GPS-based street
1211 first section of virtual street
1211L left boundary of first section of virtual street
1211R right boundary of first section of virtual street
1211W width of first section of virtual street
1212 curved section of virtual street
1212L left boundary of the virtual section
1212R right boundary of the virtual section
1212W width of the curved section
1213 second section of virtual street
1213L left boundary of the second section of virtual street
1213R right boundary of the second section of virtual street
1213W width of the second section of virtual street
1217D edge first direction of delivery drone on the virtual street
1290 X-Y-Z Cartesian coordinate system
1301 GPS-based street
1310 virtualized infrastructure based on GPS-based street
1311 first level virtual street
1312 second level virtual street
1313 third level virtual street
1390 X-Y-Z Cartesian coordinate system
1401 GPS-based street
1402 street for left turn
1403 street for right turn
1410 virtualized infrastructure
1411 first level virtual street
1412 virtual street for left turn
1413 virtual street for right turn
1415 second level virtual street
1416 virtual street for left turn
1417 virtual street for right turn
1419 third level virtual street
1419D safe moving direction on third level virtual street
1420 virtual street for left turn
1421 virtual street for right turn
1422 vertical virtual street
1422D1 virtual climb to second virtual street
1422D2 virtual climb to third virtual street
1422D3 virtual climb to higher virtual street
1430 intruding obstacle in the first and second virtual streets
1490 X-Y-Z Cartesian coordinate system
1501 GPS-based street
1501I freeway interchange that interferes with virtual streets
1502 first level freeway at the interchange
1503 second level freeway at the interchange
1510 virtualized infrastructure built on GPS-based freeway
1511 first level virtual street before the interchange
1514 second level virtual street before freeway
1514D1 vertical climb direction to second level virtual street
1514D2 vertical climb direction to third level virtual street
1514D3 vertical climb direction to higher level virtual street
1515 second level virtual street section
1516 virtual street for left turn
1517 virtual street for right turn
1518 third level virtual street
1519 second level virtual street section
1520 first virtual cross street for left turn
1521 second virtual cross street for right turn
1590 X-Y-Z Cartesian coordinate system
1601 GPS-based street in front of a condominium
1610 virtualized infrastructure in front of the condominium
1611 first level virtual street
1612 second level virtual street
1613 third level virtual street
1614 fourth level virtual street
1615 fifth level virtual street
1617 sixth level virtual street
1618 seventh level virtual street
1619 eighth level virtual street
1620 condominium
1690 X-Y-Z Cartesian coordinate system
1701 GPS-based street
1701L left boundary of GPS-based street
1701R right boundary of GPS-based street
1710 virtualized infrastructure
1711 first level virtual street
1711L left boundary of first level virtual street
1711R right boundary of first level virtual street
1712 second level virtual street
1712L left boundary of second level virtual street
1712R right boundary of second level virtual street
1720 condominium or tall building
1730 single-storied residential house
1790 X-Y-Z Cartesian coordinate system
1801 GPS-based street
1810 virtualized infrastructure
1811 first level virtual street
1811L left boundary of first level virtual street
1811R right boundary of first level virtual street
1812 second level virtual street
1820 condominium or tall building
1821 ground level
1822 first level
1823 second level
1890 X-Y-Z Cartesian coordinate system
1900 schematic diagram of the electrical system
1901 electronic speed control (ESC)
1902 electric ducted fans
1903 servo motors for tilt and rotation
1904 smart battery system for electrical components (SBS)
1905 SBS for EDF
1906 solar panels
1920 control system
1921 electronic gyroscope and sensors
1922 GPS altitude sensor 1923 collision avoidance sensors, i.e., radar, LiDAR, camera
1924 imaging devices
1925 memory
1925M 3D virtualized infrastructure map
1925P drone operation program instructions
1926 LCD and speaker for face-time
1927 input/output (I/O) port
1928 Central Processing Unit (CPU)
1929-1 top and bottom safety airbags ignition controllers
1929-2 middle safety airbag ignition controller
1930 mobile internet module & SIM card
1931 drone electrical connections
1932 wireless communication channels
1950 first network
1951 communication and data center (operator)
1960 second network
1961 communication device A (buyer)
1962 communication device B (seller)

What is claimed is:

1. A delivery drone, comprising:
a three-dimension (3D) container with a top side, a bottom side, lateral sides that form a container space for storing a payload;
a plurality of thrust motors arranged in an array that is mechanically connected to an exterior surface of said bottom side; and
a drone electronic system, electrically coupled to said thrust motors, operable to fly said plurality of thrust motors to and from a first address and a second address along a virtualized infrastructure that is loaded into said drone electronic system, wherein said virtualized infrastructure is constructed from a Global Positioning System (GPS) map and a 3D map with a common coordinate system.

2. The delivery drone of claim 1 wherein said 3D container has a parallelepiped shape and said plurality of thrust motors are arranged in an N×M array where N and M are positive non-zero integers, and wherein said drone electronic system drives said plurality of thrust motors and said delivery drone with a narrowest side of said parallelepiped shape first when N is different from M and when said parallelepiped shape is an elongated rectangle.

3. The delivery drone of claim 1 wherein said parallelepiped shaped is a cubic having equal sides joint together by edges; and wherein said plurality of thrust motors is arranged in a square array and wherein said drone electronic system drives said delivery drone so that said edge moves first.

4. The delivery drone of claim 1 wherein each of said plurality of thrust motors is a jet engine.

5. The delivery drone of claim 1 wherein each of said plurality of thrust motors comprises:
a frame bracket mechanically connected to rotate around a first axis perpendicular to said exterior surface of said bottom side of said three-dimension (3D) payload container;
an electric ducted fan (EDF) mechanically connected to tilt around a second axis parallel to aid exterior surface of said bottom side of said three-dimension (3D) payload container; and
at least one servo motors electrically coupled to tilt said EDF and to rotate said frame bracket.

6. The delivery drone of claim 5 further comprises an electronic speed control (ESC) unit configured to control a speed of said electric ducted fan (EDF), and wherein said at least one servo motors are configured to change the flight direction of said 3D delivery drone.

7. The delivery drone of claim 6 further comprises a first smart battery system electrically coupled to provide and manage voltage supplies to said plurality of thrust motors.

8. The delivery drone of claim 4 wherein said drone electronic system further comprises:
a central processing unit configured to control an operation of said delivery drone in accordance with an optimal flight path set by said virtualized infrastructure;
a memory device, electrically coupled to said central processing unit, operable to store said virtualized infrastructure and a drone operation program;
a network interface unit, electrically coupled to said central processing unit, operable to enable communication between said delivery drone and a plurality of communication devices via a network;
a plurality of sensors, electrically coupled to said central processing unit, operable to provide real-time data related to said operation of said 3D delivery drone;
an input/output port; and
a second smart battery system (SBS) electrically coupled to provide voltage supplies to said central processing unit, said memory device, and said interface unit, said plurality of sensors, and said input/output port.

9. The delivery drone of claim 8 wherein said plurality of sensors further comprises:
a GPS altitude sensor configured to sense an altitude of said delivery drone;
a collision avoidance sensor configured to detect incoming object and to inform said central processing unit to avoid collision with said incoming object;
an accelerator sensor configured to detect said speed of said delivery drone;
a temperature sensor configured to sense the internal temperature inside said delivery drone; and
a magnetic sensor configured to sense the direction, a X-Y-Z Cartesian coordinate of said delivery drone, left boundaries and right boundaries of said virtualized infrastructure.

10. The delivery drone of claim 9 wherein said drone electronic system further comprises:
a communication device including a display screen and a microphone electrically coupled to said input/output port for face-time communication between a customer and a data center; and
an imaging device, electrically coupled to said network interface and said input/output port, for capturing and sending back real-time images of a surrounding area.

11. A payload delivery system, comprising:
a wingless delivery drone comprising a plurality of thrust motors mechanically connected to an exterior surface of a bottom side of said wingless delivery drone, and a drone electronic system;
a three-dimension (3D) virtualized infrastructure of a geographical cell within which said delivery drone is configured to operate, wherein said 3D virtualized infrastructure p further comprises a plurality layers of streets in accordance with a Global Positioning System (GPS) and a 3D model of said geographical cell; and
an instruction program comprising instructions that cause said drone electronic system fly said wingless delivery drone to and from a first address and a second address within said geographical cell.

12. The payload delivery system of claim 11 wherein said wingless delivery drone has a parallelepiped shape and said plurality of thrust motors are arranged in an N×M array where N and M are positive non-zero integers, and wherein said drone electronic system drives said plurality of thrust motors and said wingless delivery drone with a narrowest side of said parallelepiped shape first when N is different from M and when said parallelepiped shape is an elongated rectangle.

13. The payload delivery system of claim 11 wherein wingless delivery drone is a cubic having equal sides joint together by edges; and wherein said plurality of thrust motors is arranged in a square array and wherein said drone electronic system drives said wingless delivery drone with said edge moving first.

14. The payload delivery system of claim 13 wherein each of said plurality of thrust motors comprises:
   a frame bracket mechanically connected to rotate around a first axis perpendicular to said exterior surface of said bottom side of said three-dimension (3D) payload container;
   an electric ducted fan (EDF) mechanically connected to tilt around a second axis parallel to aid exterior surface of said bottom side of said wingless delivery drone;
   at least one servo motors electrically coupled to tilt said EDF and to rotate said frame bracket;
   an electronic speed control (ESC) unit configured to control a speed of said electric ducted fan (EDF), and wherein said at least one servo motors are configured to change the flight direction of said wingless delivery drone and said electronic speed control unit is configured to control the speed o of said wingless delivery drone; and
   a first smart battery system electrically coupled to provide and manage voltage supplies to said plurality of thrust motors.

15. The payload delivery system of claim 11 wherein said drone electronic system further comprises:
   a central processing unit configured to control said operation of said wingless delivery drone in accordance with an optimal flight path set by said virtualized infrastructure;
   a memory device, electrically coupled to said central processing unit, operable to store said virtualized infrastructure and a drone operation program;
   a network interface unit, electrically coupled to said central processing unit, operable to enable communication between said wingless delivery drone and a plurality of communication devices via a network;
   an input/output port;
   a second smart battery system (SBS) electrically coupled to provide voltage supplies to said central processing unit, said memory device, and said interface unit, said plurality of sensors, and said input/output port;
   a GPS altitude sensor configured to sense altitude of said wingless delivery drone;
   a collision avoidance sensor configured to detect incoming object and to inform said central processing unit to avoid collision with said incoming object;
   an accelerator sensor configured to detect said speed of said wingless delivery drone;
   a temperature sensor configured to sense the internal temperature inside said wingless delivery drone;
   a magnetic sensor configured to sense the direction, a X-Y-Z Cartesian coordinate of said wingless delivery drone, left boundaries and right boundaries of said virtualized infrastructure;
   a communication device including a display screen and a microphone electrically coupled to said input/output port for facetime communication between a customer and a data center; and
   an imaging device, electrically coupled to said network interface and said input/output port, for capturing and sending back real-time images of a surrounding area.

16. The payload delivery system of claim 15 further comprising:
   at least one networks electrically coupled to communicate with said drone electronic system;
   a control and command center electrically coupled to communicate with said drone electronic system via said at least one networks; and
   at least one computing devices electrically coupled to communicate to said drone electronic system and said control and command center via said at least one networks, wherein said control and command center further comprises a data center operative to store flight histories and to compute analytics of said wingless delivery drone based on said flight histories.

17. A method of delivering a payload using a delivery drone, comprising:
   forming a virtualized infrastructure comprising a plurality of virtual streets and predetermined altitudes;
   receiving a first address and a second address where said delivery drone is programmed to deliver said payload; and
   selecting an optimal virtual route for said first address and said second address;
   flying said delivery drone along said optimal virtual route; and
   delivering said payload upon arrival to said second address.

18. The method of claim 17 wherein said forming a virtualized infrastructure further comprises:
   stitching a Global Positioning System (GPS) map having the same X-Y-Z Cartesian coordinates with a 3D model of the geographical area within which said delivery drone is programmed to deliver said payload and
   forming virtual streets by copying GPS streets of said GPS map, elevating, and stacking said virtual streets into multiple layers at an at least predetermined safe altitudes above said GPS streets.

19. The method of claim 17 wherein said flying said delivery drone along said optimal virtual routes further comprises:
   sensing left boundaries and right boundaries of said virtual streets;
   detecting said altitude of said delivery drone;
   detecting operation conditions and surrounding environment of said delivery drone along said optimal virtual route; and
   detecting incoming objects that intrude into said optimal virtual route and avoiding collision with said incoming objects by changing a flight trajectory of said delivery drone from said optimal virtual route.

20. The method of claim 19 wherein said delivery said package further comprises:
   if said second address is a condominium, crossing said left boundaries or said right boundaries of said virtual street so that said delivery drone either (a) flies closer to a balcony within a reach of an adult customer to deliver said package, or (b) flies over and lands inside said balcony to deliver said package;

if said second address is a single-storied house, crossing left boundaries or right boundaries, flying and landing inside a lawful limit of said single-storied house to deliver said payload; and enabling a face-time communication between said customer and a center using a communication device located on said delivery drone.

* * * * *